(12) United States Patent
VanDyne et al.

(10) Patent No.: US 7,707,992 B2
(45) Date of Patent: May 4, 2010

(54) METHOD AND APPARATUS FOR CONTROLLING EXHAUST GAS RECIRCULATION AND START OF COMBUSTION IN RECIPROCATING COMPRESSION IGNITION ENGINES WITH AN IGNITION SYSTEM WITH IONIZATION MEASUREMENT

(75) Inventors: Ed VanDyne, Loveland, CO (US); Mark R. Woolston, Fort Collins, CO (US)

(73) Assignee: Woodward Governor Company, Fort Collins, CO (US)

( * ) Notice: Subject to any disclaimer, the term of this patent is extended or adjusted under 35 U.S.C. 154(b) by 805 days.

(21) Appl. No.: 10/576,989

(22) PCT Filed: Oct. 27, 2004

(86) PCT No.: PCT/US2004/035651
§ 371 (c)(1),
(2), (4) Date: Dec. 19, 2006

(87) PCT Pub. No.: WO2005/044382
PCT Pub. Date: May 19, 2005

(65) Prior Publication Data
US 2007/0079817 A1    Apr. 12, 2007

Related U.S. Application Data

(60) Provisional application No. 60/516,148, filed on Oct. 31, 2003.

(51) Int. Cl.
  F02M 25/07    (2006.01)
  F02M 7/00     (2006.01)
  F02B 47/08    (2006.01)
(52) U.S. Cl. .................... 123/435; 123/568.21
(58) Field of Classification Search .............. 123/435, 123/568.21, 406.21, 406.23, 406.44; 73/35.08, 73/116, 117.3; 701/101, 102, 108, 109
See application file for complete search history.

(56) References Cited

U.S. PATENT DOCUMENTS

| | | | |
|---|---|---|---|
| 6,805,099 B2 * | 10/2004 | Malaczynski et al. | 123/435 |
| 6,935,310 B2 | 8/2005 | Viele et al. | |
| 6,994,073 B2 * | 2/2006 | Tozzi et al. | 123/435 |
| 7,063,079 B2 | 6/2006 | Huberts et al. | |
| 7,086,382 B2 * | 8/2006 | Daniels et al. | 701/103 |
| 7,137,382 B2 * | 11/2006 | Zhu et al. | 123/435 |
| 7,137,385 B2 | 11/2006 | Newton | |

* cited by examiner

*Primary Examiner*—Hieu T Vo
(74) *Attorney, Agent, or Firm*—Reinhart Boerner Van Deuren P.C.

(57) ABSTRACT

An apparatus and method to detect combustion conditions using ion signals for use in a feedback control of a reciprocation engine is presented. The ion signals are used as a feedback signal to control EGR and diesel injection timing. The apparatus is an ignition system with a spark plug type of sensor. The ignition system is used to provide a cold start mechanism for diesel engines and start of combustion for spark ignition engines. The ignition is combined with ion sensing feedback that can control the engine.

24 Claims, 21 Drawing Sheets

METHOD AND APPARATUS FOR CONTROLLING EXHAUST GAS RECIRCULATION AND START OF COMBUSTION IN RECIPROCATING COMPRESSION IGNITION ENGINES WITH AN IGNITION SYSTEM WITH IONIZATION MEASUREMENT

CROSS-REFERENCE TO RELATED PATENT APPLICATIONS

This patent application claims the benefit of U.S. Provisional Patent Application No. 60/516,148, filed Oct. 31, 2003.

FIELD OF THE INVENTION

The present invention relates generally to ignition systems with ionization feedback in diesel engines, and more particularly relates to such systems in reciprocating compression ignition engines in which cold start combustion is started with a plasma discharge ignition system.

BACKGROUND OF THE INVENTION

Government agencies and are reducing the amount of allowed emissions in diesel and other compression ignition engines in an effort to reduce pollution in the environment. For example, over the past decade, increasingly more stringent heavy duty on-highway engine emission regulations have led to the development of engines in which $NO_x$ and diesel particulate emissions have been reduced by as much as seventy percent and ninety percent, respectively. Proposed regulations for new heavy duty engines require additional $NO_x$ and diesel particulate emission reductions of over seventy percent from existing emission limits. These emission reductions represent a continuing challenge to engine design due to the $NO_x$-diesel particulate emission and fuel economy tradeoffs associated with most emission reduction strategies. Emission reductions are also desired for the on and off-highway in-use fleets.

Traditionally, there have been two primary forms of reciprocating piston or rotary internal combustion engines. These forms are diesel and spark ignition engines. While these engine types have similar architecture and mechanical workings, each has distinct operating properties that are vastly different from each other. The diesel engine controls the start of combustion (SOC) by the timing of fuel injection. A spark ignited engine controls the SOC by the spark timing. As a result, there are important differences in the advantages and disadvantages of diesel and spark-ignited engines. The major advantage that a spark-ignited natural gas, or gasoline, engine (such as passenger car gasoline engines and lean burn natural gas engines) has over a diesel engine is the ability to achieve extremely low $NO_x$ and particulate emissions levels. The major advantage that diesel engines have over premixed charge spark ignited engines is higher thermal efficiency.

One reason for the higher efficiency of diesel engines is the ability to use higher compression ratios than spark ignited engines because the compression ratio in spark ignited engines has to be kept relatively low to avoid knock. Typical diesel engines, however, cannot achieve the very low $NO_x$ and particulate emissions levels that are possible with premixed charge spark ignited engines. Due to the mixing controlled nature of diesel combustion a large fraction of the fuel exists at a very fuel rich equivalence ratio, which is known to lead to particulate emissions. Spark ignited engines, on the other hand, have nearly homogeneous air fuel mixtures that tend to be either lean or close to stoichiometric, resulting in very low particulate emissions. A second consideration is that the controlled combustion in diesel engines occurs when the fuel and air exist at a near stoichiometric equivalence ratio which leads to high temperatures. The high temperatures, in turn, cause high $NO_x$ emissions. Lean burn spark ignited engines, on the other hand, burn their fuel at much leaner equivalence ratios which results in significantly lower temperatures leading to much lower $NO_x$ emissions. Stoichiometric spark ignited engines, on the other hand, have high $NO_x$ emissions due to the high flame temperatures resulting from stoichiometric combustion. However, the virtually oxygen free exhaust allows the $NO_x$ emissions to be reduced to very low levels with a three-way catalyst.

Recently, some members of industry have directed their efforts to another type of engine that utilizes homogeneous charge compression ignition (HCCI) to reduce emissions. Engines operating on HCCI principles rely on autoignition of a premixed fuel/air mixture to initiate combustion. The fuel and air are mixed, in the intake port or the cylinder, before ignition occurs. The extent of the mixture may be varied depending on the combustion characteristics desired. Some engines are designed and/or operated to ensure the fuel and air are mixed into a homogeneous, or nearly homogeneous, state. Additionally, an engine may be specifically designed and/or operated to create a somewhat less homogeneous charge having a small degree of stratification. In both instances, the mixture exists in a premixed state well before ignition occurs and is compressed until the mixture autoignites. HCCI combustion is characterized in that the vast majority of the fuel is sufficiently premixed with the air to form a combustible mixture throughout the charge by the time of ignition and throughout combustion and combustion is initiated by compression ignition. Unlike a diesel engine, the timing of the fuel delivery, for example the timing of injection, in a HCCI engine does not strongly affect the timing of ignition. The early delivery of fuel in a HCCI engine results in a premixed charge that is very well mixed, and preferably nearly homogeneous, thus reducing emissions, unlike the stratified charge combustion of a diesel, which generates higher emissions. Preferably, HCCI combustion is characterized in that most of the mixture is significantly leaner than stoichiometric to reduce emissions, which is unlike the typical diesel engine cycle in which a large portion, or all, of the mixture exists in a rich state during combustion Other members of industry have moved to "dual mode" engines that operate on both a gaseous fuel mixture and diesel fuel. These engines operate in HCCI mode at part load and in diesel mode or SI mode at full load. As a result, dual fuel engines produce emissions similar to most conventional diesel and natural gas engines. In particular, in known dual mode engines using diesel fuel and natural gas at high load, only a small amount of diesel fuel is required to start ignition and the emissions produced would be similar to a spark ignited natural gas engine. Under other conditions when substantial diesel fuel is injected, the emissions produced would be similar to a conventional diesel engine.

Regardless of engine type, it is required to detect engine combustion conditions during engine operation in order to monitor emissions. Of all the measuring methods for detecting engine combustion conditions, ion current measurement has been considered to be highly useful because it can be used for directly observing the chemical reaction resulting from the engine combustion. However, ion current detectors are typically incorporated into glow plugs. For example, an electric conductive layer made of platinum is formed on a surface of the heating element of the glow plug and is electrically insulated from the combustion chamber and the glow plug clamping fixture.

In these glow plugs, ignition and combustion of fuel are generally promoted by a heating action of the glow plug heating element when the engine starts at low temperature. The heating state of the heating element usually continues after warm-up of the engine has been completed until the combustion is stabilized (generally, referred to as "afterglow"). After completion of the afterglow, the heating action of the glow plug is stopped and the process of detecting ion current is started. Carbon adheres to the circumference of the ceramic heating portion of the glow plug and reduces the insulation resistance between the exposed electrode used for ion current detection and the grounded portion (plug housing and cylinder head) that is insulated from the electrode. In this case, a flow of leakage current may be created through the adhered carbon even if no ion is derived from the combustion gases. When this happens, the ion current detected shows a waveform different from a desired one due to occurrence of the leakage current, and such an incorrect detection result causes deterioration in the accuracy of ignition stage and flame failure detections. Furthermore, the electrode is almost completely exposed into the combustion chamber and the space between the housing and the electrode is narrow. For this reason, there is a danger that the electrode is shorted to the ground and the housing is made conductive due to adhesion of carbon to the electrode surface, resulting in an error in detecting ion current.

Additionally, since the ion current detecting electrode supported at the tip of the glow plug directly touches a flame having a high temperature, stresses tend to be concentrated in the neighborhood of the ion current detecting electrode and could damage the ceramic glow plug such as to crack it.

BRIEF SUMMARY OF THE INVENTION

In view of the foregoing, an object of the present invention is to reliably detect ionization signals in compression ignition engines and dual mode engines and use the ionization signals as feedback in the control of the engines.

The foregoing object is among those attained by the invention, which provides a method and apparatus for reliably detecting ionization current and using the ionization current as feedback in the control of the invention. The ion sensor may be a spark plug type of sensor that is shielded completely or partially from direct impingement of fuel spray and the engulfment of a diffusive flame or a sensing apparatus integrated into the fuel injector of the combustion chamber. The spark plug sensor may also be used to replace glow plugs to provide a cold start mechanism for diesel ignition.

In addition to using the apparatus to provide cold starts for diesel ignition, the apparatus is used in a control loop that controls the amount of exhaust gas recirculation (EGR) into an engine based on the ion sensor's measurement of ionization current flowing in the combustion chamber.

Additional features and advantages of the invention will be made apparent from the following detailed description of illustrative embodiments, which proceeds with reference to the accompanying figures.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 12b is an enlarged view of the ion sensor of FIG. 12a;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The present invention provides an apparatus and method to detect combustion ion current in a diesel combustion engine and perform various control functions using ionization signals such as EGR (Exhaust Gas Recirculation) control, diesel injection timing control from ignition, and cold starts of diesel engines. As used herein, the term "compression ignition engine" refers to typical reciprocating diesel engines, HCCI engines and dual mode engines.

Figure 1:
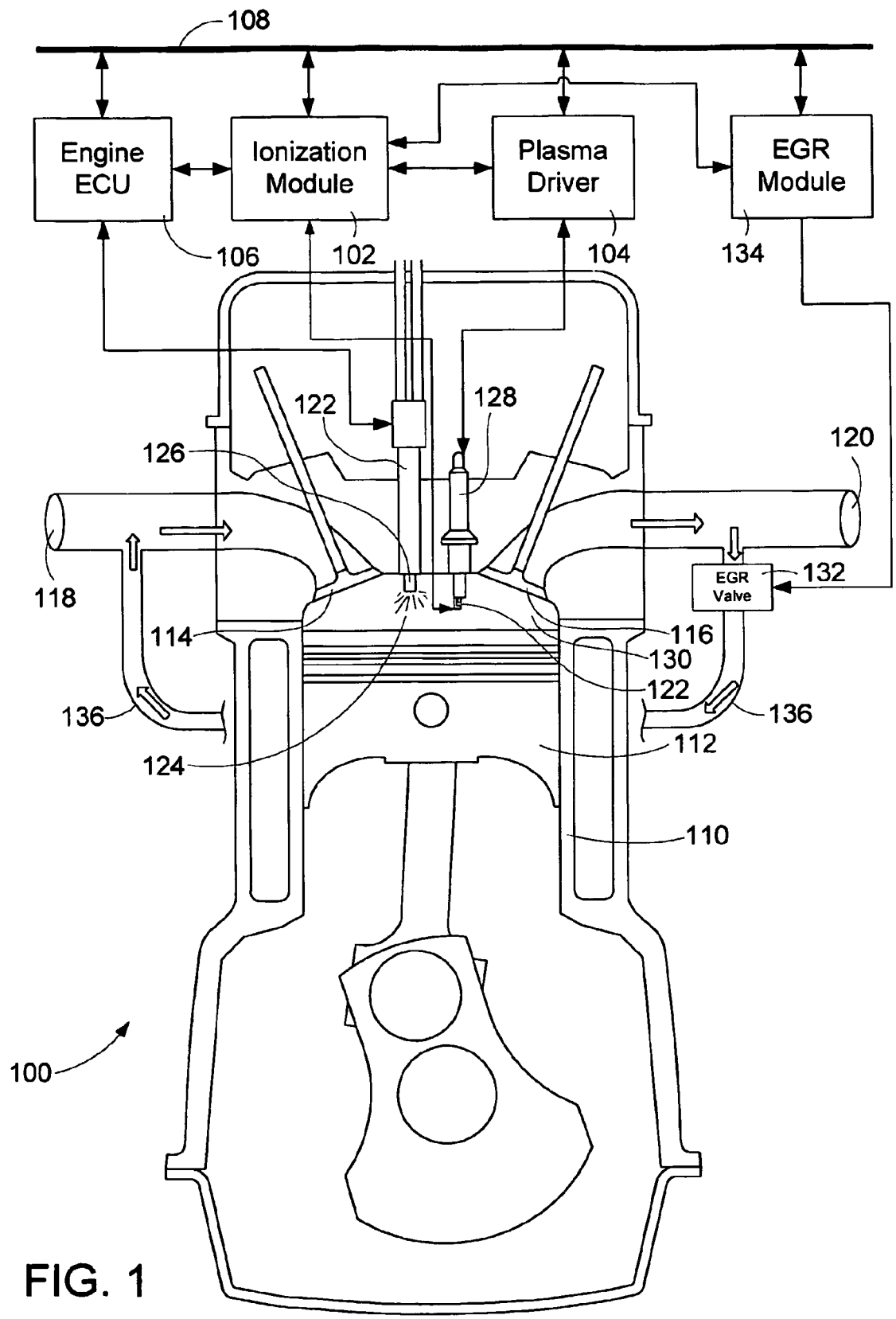
FIG. 1 is a schematic view of a plasma ignition control of the present invention.

Turning to the drawings, wherein like reference numerals refer to like elements, the invention is illustrated as being implemented in a suitable operating environment. Referring initially to FIG. 1, a system 100 exemplifying the operating environment of the present invention is shown. The system includes an ionization module 102, a plasma driver 104, an engine electronic control unit (ECU) 106, and a compression ignition engine. The ionization module 102 communicates with the ECU 106 and other modules via the CAN (Controller Area Network) bus 108. The compression ignition engine includes engine cylinder 110 (e.g., a combustion chamber) that has a piston 112, an intake valve 114 and one or more exhaust valves 116. An intake manifold 118 is in communication with the cylinder 110 through the intake valve 114. An exhaust manifold 120 receives exhaust gases from the cylinder 110 via exhaust valve(s) 116. The intake valve and exhaust valve(s) may be electronically, mechanically, hydraulically, or pneumatically controlled or controlled via a camshaft. A fuel injector 122 injects fuel 124 into the cylinder 110 via nozzle 126. An ion sensing apparatus 128 is used to sense ion current and in one embodiment, ignites the air/fuel mixture in the combustion chamber 130 of the cylinder 110 during cold start of the engine. The plasma driver 104 provides power to the ion sensing apparatus 128 to provide a high energy plasma discharge to keep the ion sensing detection area of the ion sensing apparatus clean from fuel contamination due to carbon buildup. While shown separate from the fuel injector 122, the ion sensing apparatus 128 may be integrated with the fuel injector 122. The exhaust manifold 120 is in fluid communication with EGR valve 132. The EGR valve is controlled by EGR module 134. The EGR valve 132 provides exhaust gas to the intake manifold 118. For simplicity, the recirculation path from the EGR valve 132 to the intake is designated by arrows 136. In some systems, the exhaust gas may be further cooled by means of a cooler in the exhaust gas recirculation path. Additionally, the exhaust valve(s) 116 can be controlled with variable timing to assist in keeping some of the exhaust gas in the cylinder 128. While the ionization module 102, the plasma driver 104, the engine control unit 106, and the EGR module 132 are shown separately, it is recognized that these components may be combined into a single module or be part of an engine controller having other inputs and outputs.

Figure 2:
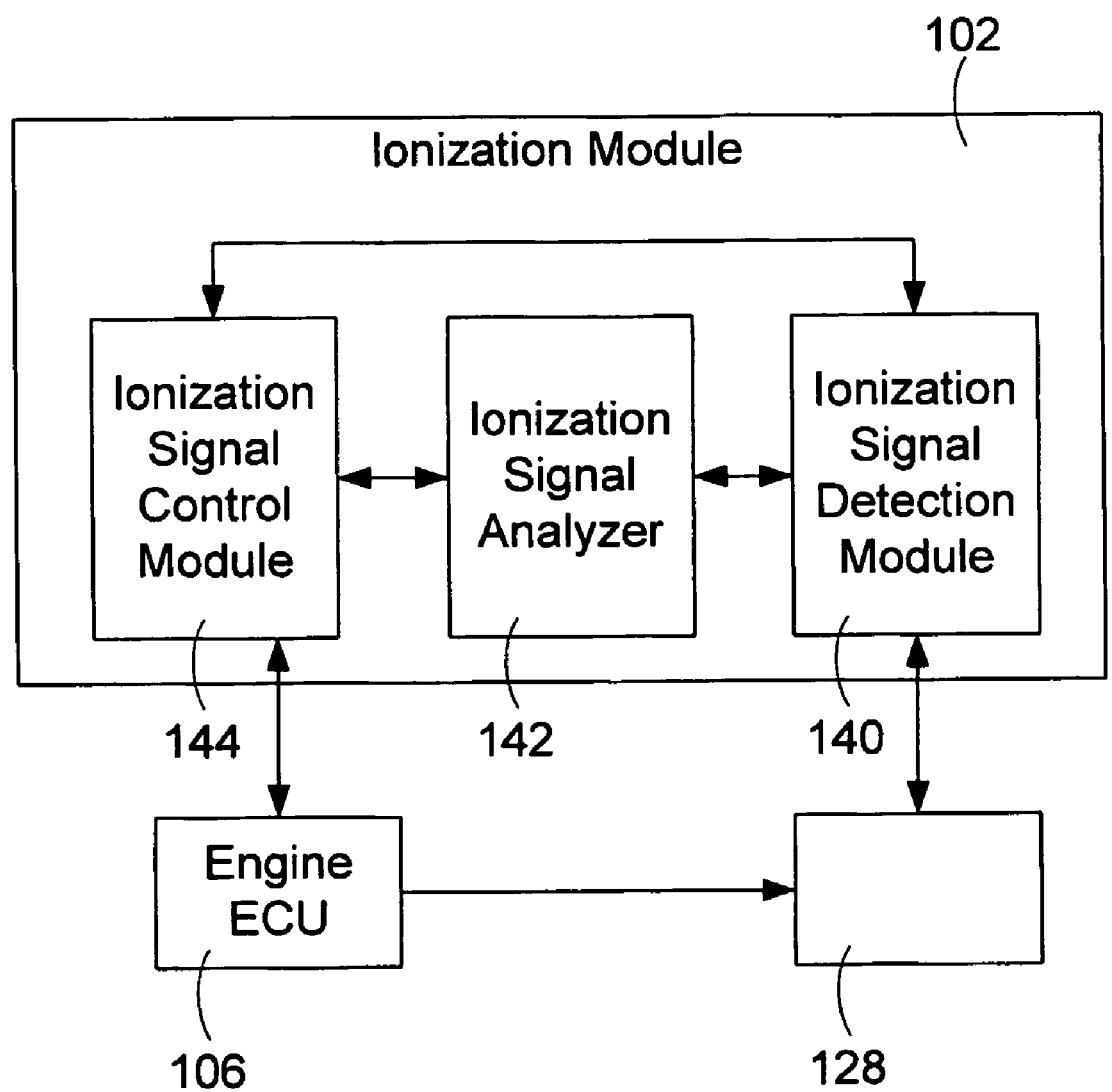
FIG. 2 is a block diagram view of the a portion of the plasma ignition control of FIG. 1.

The ionization module contains circuitry for detecting and analyzing the ionization signal. In the illustrated embodiment, as shown in FIG. 2, the ionization module 102 includes an ionization signal detection module 140, an ionization signal analyzer 142, and an ionization signal control module 144. In order to detect combustion conditions, the ionization module 102 supplies power to the ion sensing apparatus 128 after the air and fuel mixture is ignited and measures ionization signals from ion sensing apparatus 128 via ionization signal detection module 140. Ionization signal analyzer 142 receives the ionization signal from ionization signal detection module 140 and determines if an abnormal combustion condition exists. The ionization signal control module 144 controls ionization signal analyzer 142 and ionization signal detection module 140. The ionization signal control module 144 provides an indication to the engine ECU 106 as described below. In one embodiment, the ionization module 102 sends the indication to other modules in the engine system. While the ionization signal detection module 140, the ionization signal analyzer 142, and the ionization signal control module 144 are shown separately, it is recognized that they may be combined into a single module and/or be part of an engine controller having other inputs and outputs.

Returning now to FIG. 1, the ECU 106 controls fuel injection 122 to deliver fuel (and air), at a desired rate and amount, to the engine cylinder 110. The ECU also controls the amount and rate of exhaust gas being recirculated into the combustion chamber 130. The ECU 106 receives feedback from the ionization module and adjusts the fuel and EGR as described below.

Figure 3:
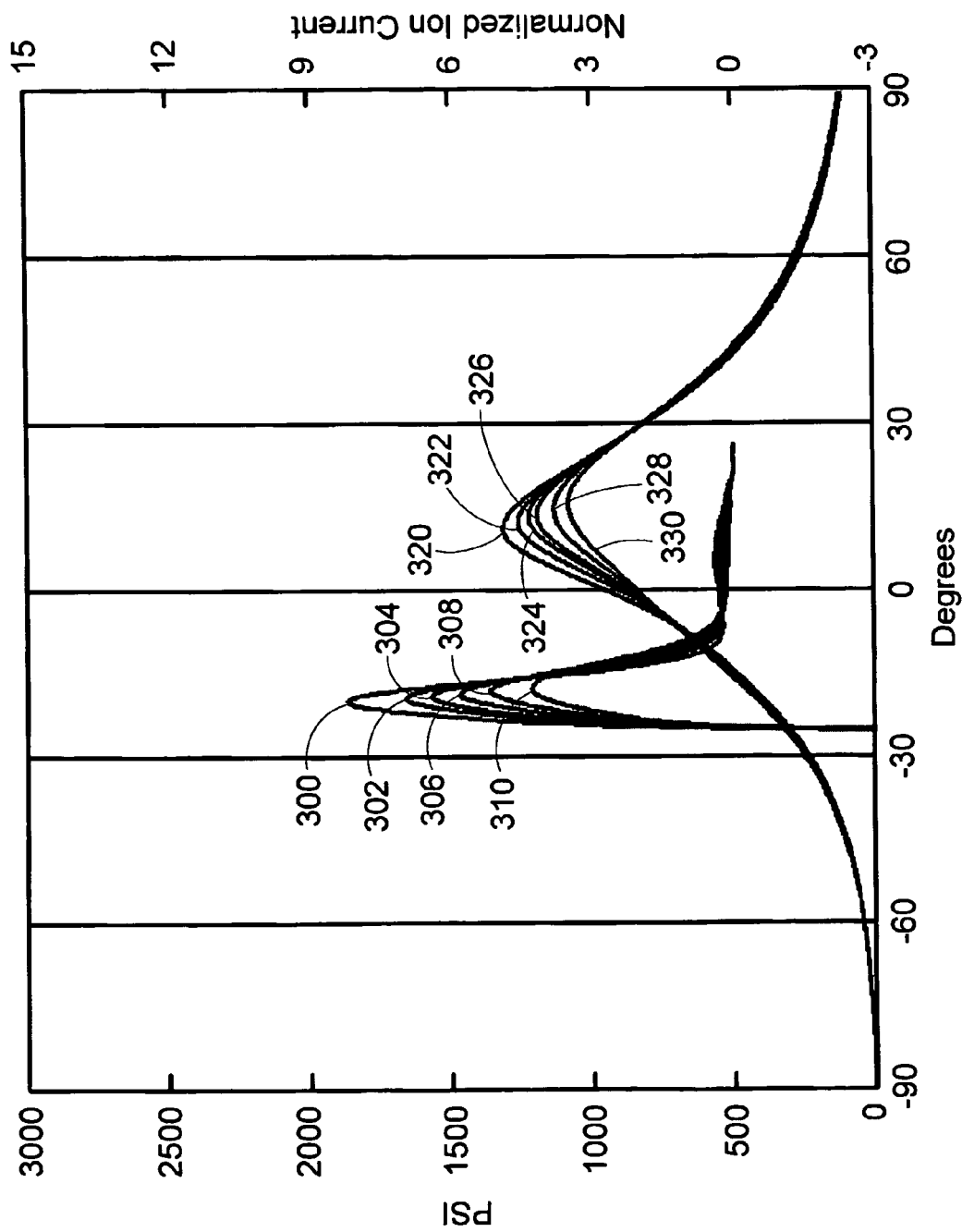
FIG. 3 is a graphical illustration of pressure and ionization current versus engine piston crank angle at various levels of $NO_x$.

The ionization signal can be correlated to the level of $NO_x$ emission and in-cylinder pressure produced during compression. Turning now to FIG. 3, the correlation between cylinder pressure traces, ion current traces and $NO_x$ levels is shown. Curves 300 to 310 are ion current traces and curves 320 to 330 are cylinder pressure traces. Curves 300 and 320 correspond to a λ of 1.58 and a $NO_x$ level of 3.2 gr/BHP*hour, where $$\lambda = \frac{\text{Actual air/fuel ratio}}{\text{Stochiometric air/fuel ratio}}.$$

Figure 4:
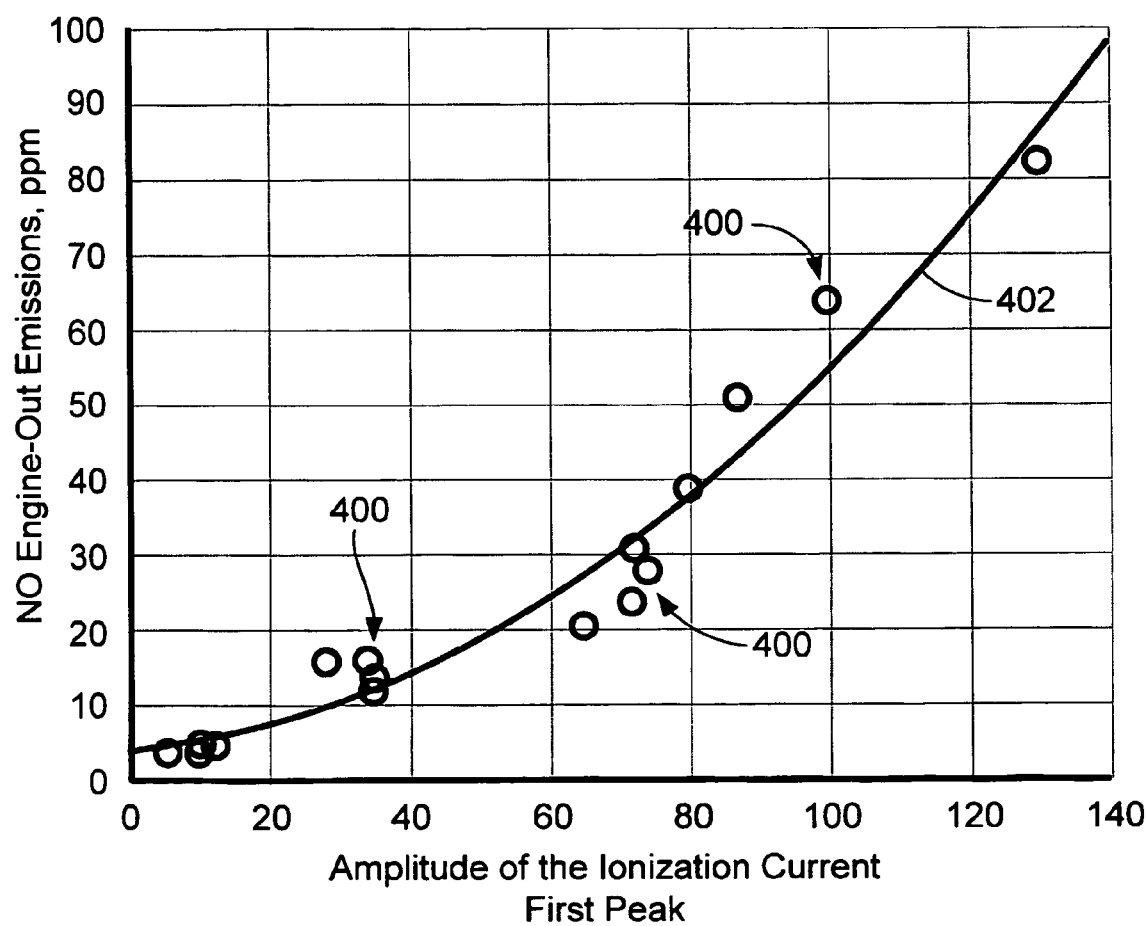
FIG. 4 is a graphical illustration of the first peak of ionization current versus engine-out emissions at various loads.

Curves 302 and 322 correspond to a λ of 1.60 and a $NO_x$ level of 1.9 gr/BHP*hour. Curves 304 and 324 correspond to a λ of 1.61 and a $NO_x$ level of 1.2 gr/BHP*hour. Curves 306 and 326 correspond to a λ of 1.62 and a $NO_x$ level of 1.1 gr/BHP*hour. Curves 308 and 328 correspond to a λ of 1.63 and a $NO_x$ level of 0.79 gr/BHP*hour. Curves 310 and 330 correspond to a λ of 1.64 and a $NO_x$ level of 0.35 gr/BHP*hour. It can be seen that as the $NO_x$ level decreases from 3.2 gr/BHP*hour to 0.35 gr/BHP*hour, the magnitude of the ion signal and the location of its peak vary in a consistent trend. Similarly, the cylinder pressure traces follow the same trend exhibited by the ion current traces. FIG. 4 illustrates how the amplitude of the first peak of the ion current changes with respect to NO engine out emissions. Operating parameters of the engine are an engine speed of 1600 rpm, a variable torque (25, 50, 75 Nm), a variable start of ignition, and a variable amount of EGR (40% to 50%). The circles (some of which are identified with reference character 400) represent actual data points and the line 402 is a fitted line based on the actual data points. From this figure, it can be seen that the amplitude of the first peak of the ion current increases as the NO engine out emissions increase.

Figure 5:
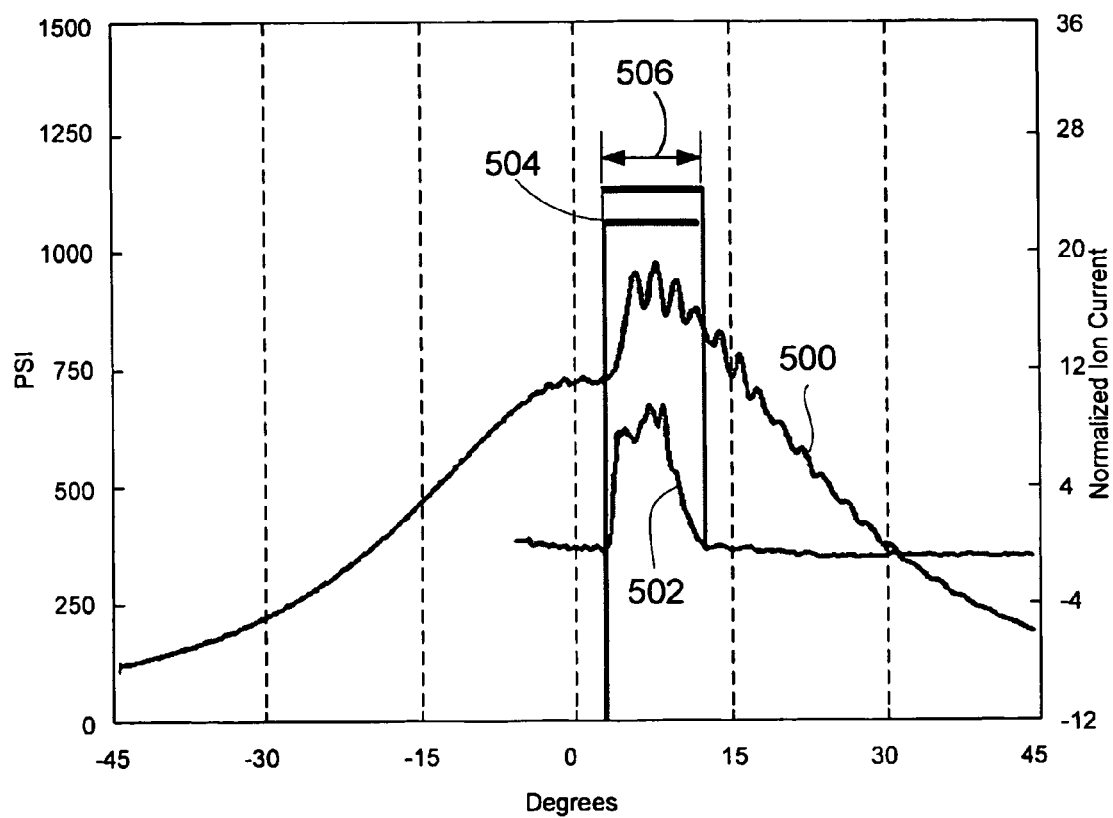
FIGS. 5-8 are graphical illustrations of pressure and ionization current versus engine piston crank angle for various conditions of speed and load.
Figure 6:
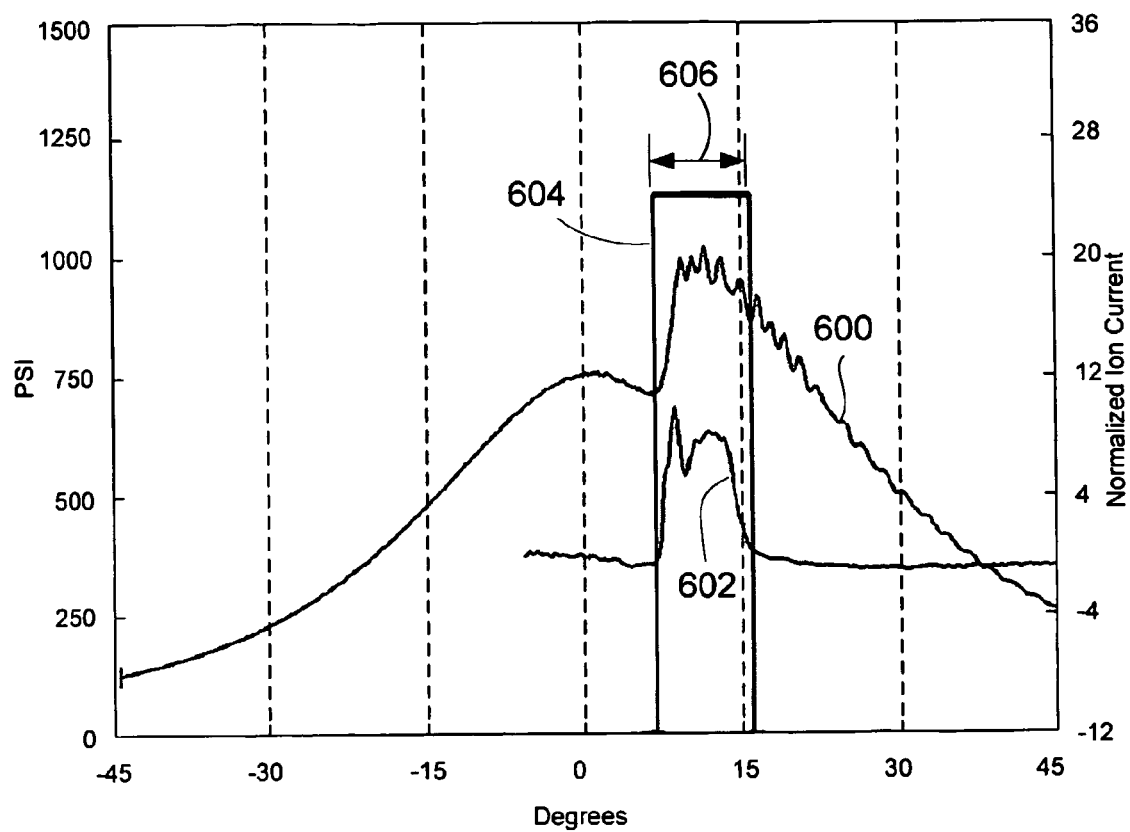
Figure 7:
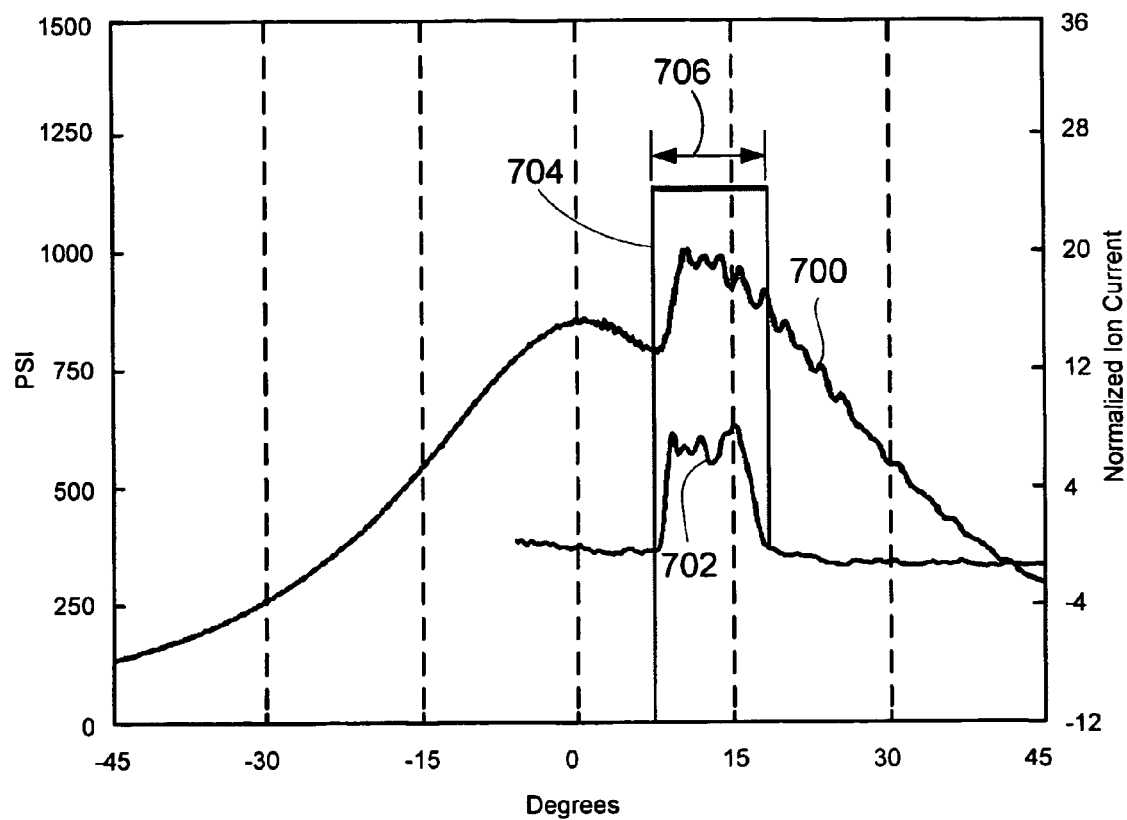
Figure 8:
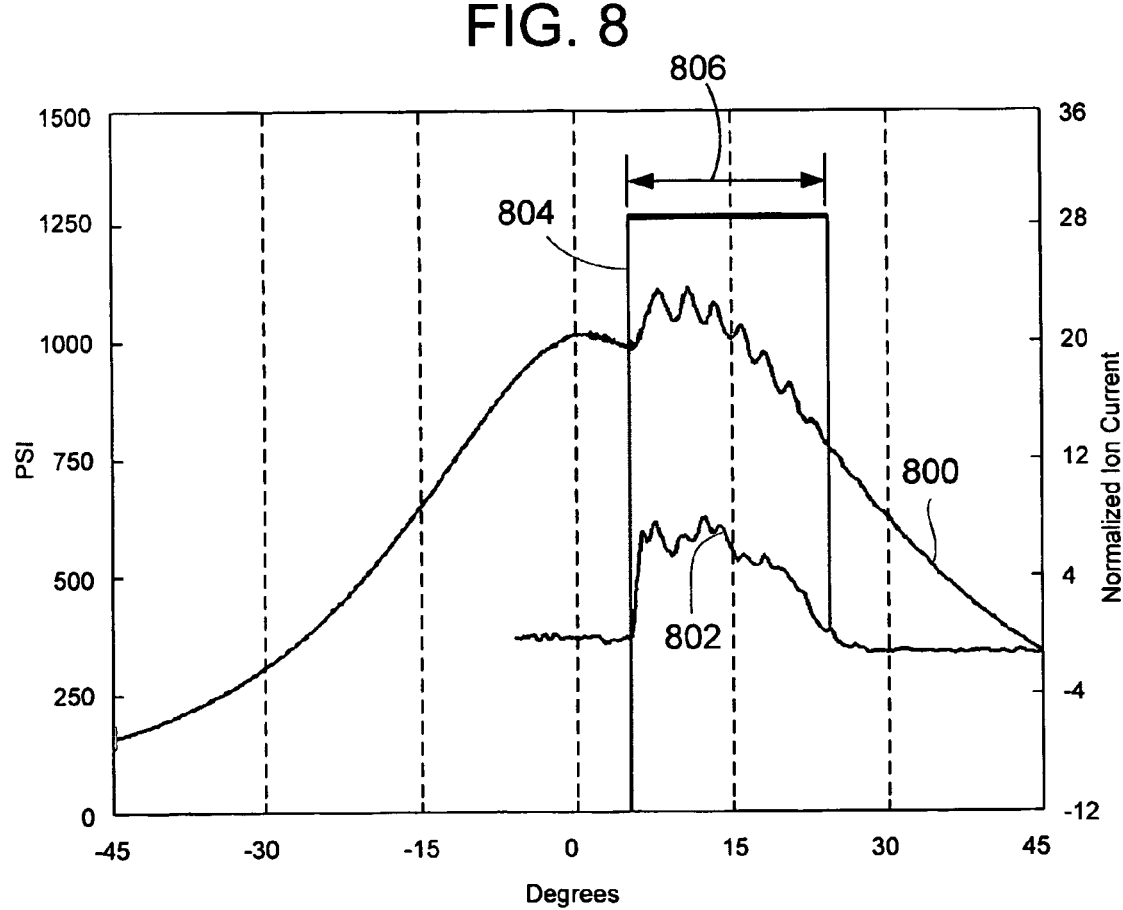

Turning now to FIGS. 5-8, the relationship between diesel combustion pressure and ion current at various speeds and loads is shown. FIG. 5 shows the relationship of pressure 500 and ion current 502 at an engine speed of 1500 rpm and a load of 50 ft-lb. The start of combustion 504 and combustion duration 506 are also shown. FIG. 6 shows the relationship of pressure 600 and ion current 602 at an engine speed of 1500 rpm and a load of 150 ft-lb. The start of combustion 604 and combustion duration 606 are also shown. FIG. 7 shows the relationship of pressure 700 and ion current 702 at an engine speed of 2000 rpm and a load of 150 ft-lb. The start of combustion 704 and combustion duration 706 are also shown. FIG. 8 shows the relationship of pressure 800 and ion current 802 at an engine speed of 2500 rpm and a load of 150 ft-lb. The start of combustion 804 and combustion duration 806 are also shown. From these figures, it can be seen that the rise of the ion current is located proximate to or at the start of combustion and the width of the ionization signal (i.e., the "crank angle" between the rise of the ion current and the fall of ion current) approximately lines up with the combustion duration that is derived from the combustion pressure.

Figure 9:
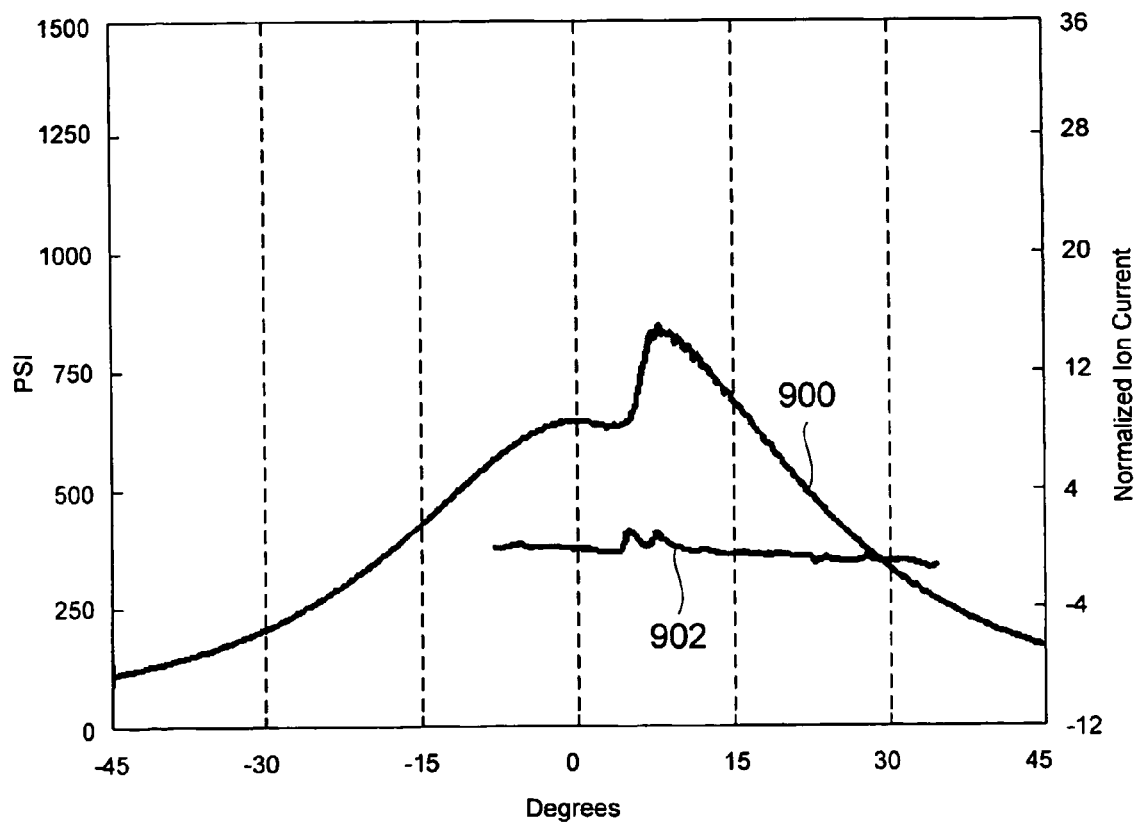
FIG. 9 is a graphical illustration of pressure and ionization current versus engine piston crank angle from plug fouling.

From FIGS. 3-8, it can be seen that ion current signals can be used to control and optimize engine performance. The ion sensing apparatus can be a separate unit or it can be integrated with the fuel injector. The sensor apparatus should be shielded from direct impingement of fuel spray from the fuel injector. If the fuel spray impinges the sensing mechanism, the ion current does not track combustion pressure because the fuel shorts the sensor. This is illustrated in FIG. 9 where it can be seen that the ion current 902 does not track the combustion pressure 900.

It should be noted that the preferred method of sensing ion current is to use a negative charge (i.e., negative voltage polarity) on the electrode of the ion sensing apparatus. The reason for this is that humidity (i.e., water vapor and high temperature steam) in the atmosphere and due to the combustion process has an affinity for positive charge. When a positive charge electrode is used, the water vapor and steam react with the positive charge and "pull" positive charge from the electrode. The net effect of this is that the magnitude of the ion signal increases, which may result in erroneous readings. In many instances, the ion signal due to humidity reaction is difficult to remove as it often has a frequency spectrum that is similar to noise.

Figure 10A:
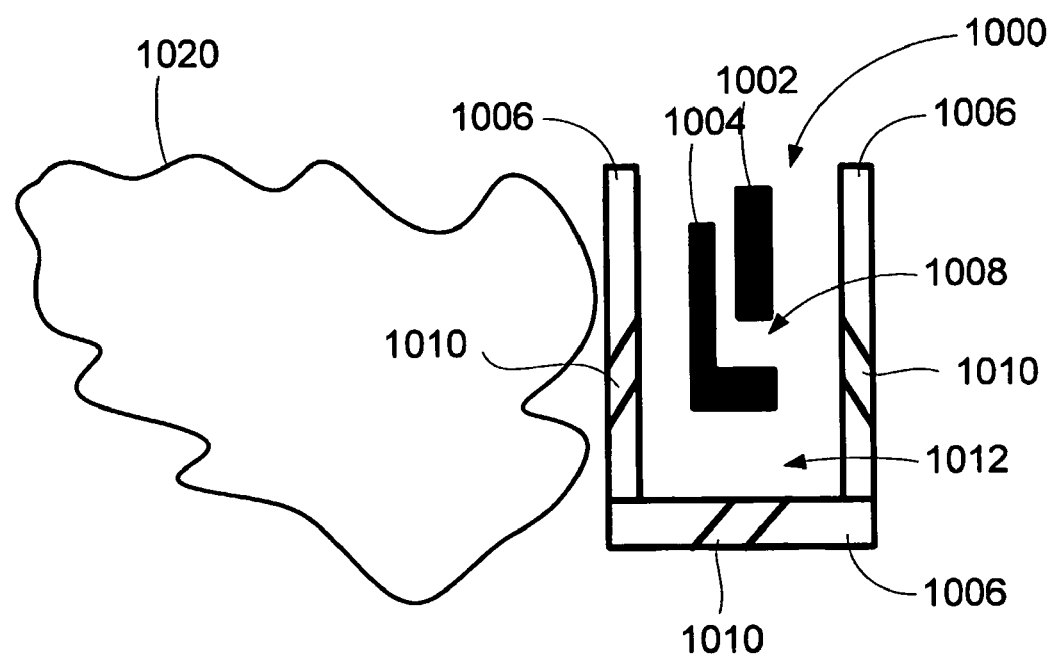
FIG. 10a is a schematic view of an embodiment of an ion sensor used with the present invention showing the ion sensor during a fuel spray impingement.
Figure 10B:
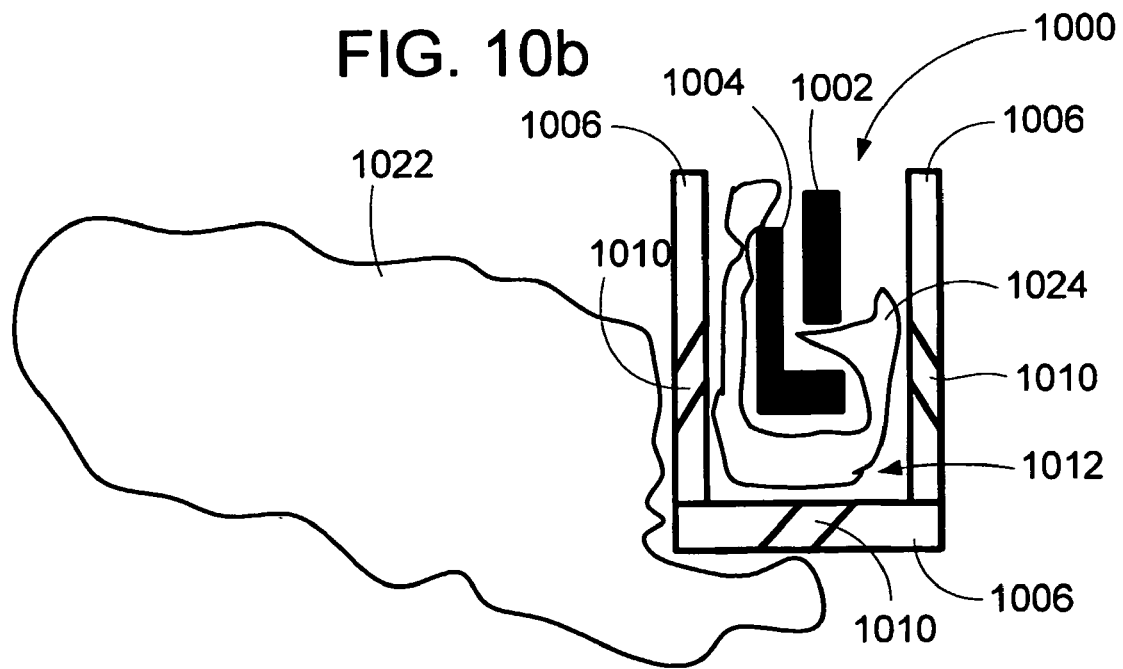
FIG. 10b is a schematic view of the ion sensor of FIG. 10a during a diffusive flame engulfment.
Figure 11A:
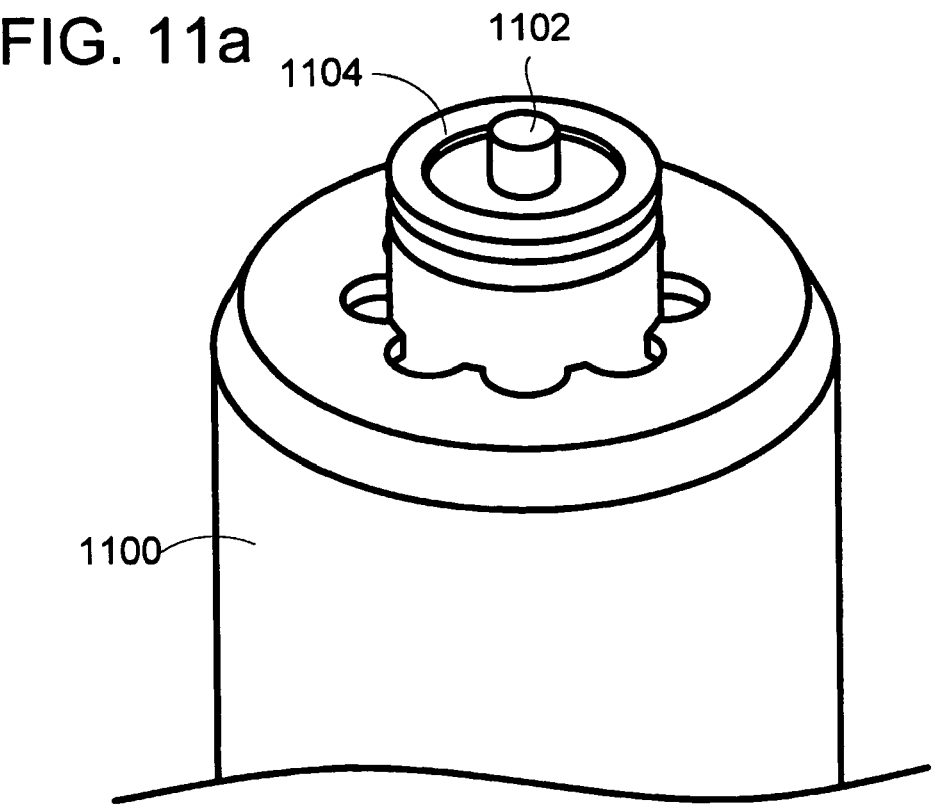
FIG. 11a is an isometric view of an end of a standard type of spark plug.
Figure 11B:
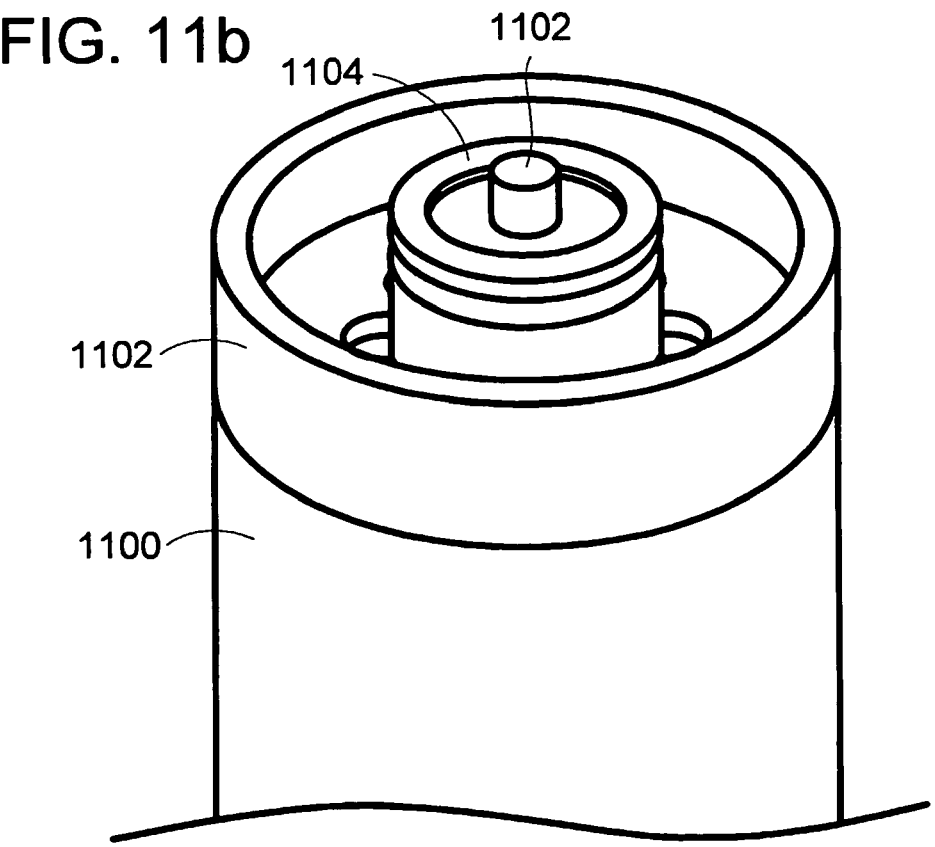
FIG. 11b is an isometric view of the spark plug of FIG. 11a with a shroud attached.

FIGS. 10a-12b illustrate various types of ion sensing apparatuses 126 that may be used by the invention. Other types of ion sensors may be used. Turning now to FIGS. 10a-10b, a spark plug type of sensor is shown. FIGS. 10a and 10b show a block diagram of a spark plug type of sensor. The sensor electrodes 1002, 1004 of sensor 1000 is shielded by shield 1006. The presence of the shield 1006 drastically reduces fouling of the sensor electrodes 1002, 1004 and sensor conduction area 1008 from the liquid fuel spray 1020. During combustion, the diffusive flame 1022 is filtered through the induction orifices 1008, which causes primarily premixed flame 1024 to occur within the sensor's shielded space 1010. The presence of the shield 1006 allows detection of combustion ions from the pre-mixed flame instead of the diffusive flame, thereby allowing correlation with combustion quality (e.g., $NO_x$ emission level). The size, number, and direction of induction orifices 1008 are determined in one embodiment using design of experiments (DOE) as is known in the art. It should be noted that the shield does not have to completely enclose the sensor electrodes 1002, 1004. Turning to FIGS. 11a and 11b, a shroud 1102 located at the sensor area can be attached to the sensor body 1100 of the plug shown in FIG. 10a. The shroud 1102 is sized such that fuel spray does not directly impinge the sensor electrodes 1002, 1004 and sensor conduction area 1008. During operation, the sensor electrodes 1002, 1004 can be energized with a high-energy current that creates a high-energy plasma discharge that keeps the sensor electrode area clean from fuel contamination and carbon build-up.

As previously indicated, the spark plug sensor may also be used to replace glow plugs to provide a cold start mechanism for diesel ignition. Energy is provided to the spark plug sensor of sufficient magnitude to create sparks that are able to ignite the diesel fuel mixture in the combustion chamber. The use of a shield/shroud overcomes the failure of prior art spark ignition systems by keeping the plugs clean from spark plug fouling by diesel fuel. The plugs stay clean by the super heating effects of the plasma sparks caused by the high-energy plasma discharge. High-energy plasma discharges are generated at currents in the ampere range as compared to high energy sparks that are generated in the hundreds of milliamperes range. As described hereinbelow, the ion sensor (e.g., the spark plug sensor) can detect and prevent abnormal engine conditions such as misfire to essentially provide a safety net for the combustion process at low load, high EGR, or HCCI modes of combustion. By preventing misfire and igniting the fuel mixture via the spark action and using surface gap spark plugs, the spark plug sensor can lower the cold start emissions of a diesel engine. The spark plug sensor can replace the glow plugs used in systems and reduce or eliminate the need for block heaters and intake air heaters that have been used to assist in the cold start process of a diesel engine. Additionally, the spark plug can be used to provide a high current spark to prevent late combustion or prevent a misfire when the engine ECU (or ionization module) senses that combustion has not begun on time.

Figure 12A:
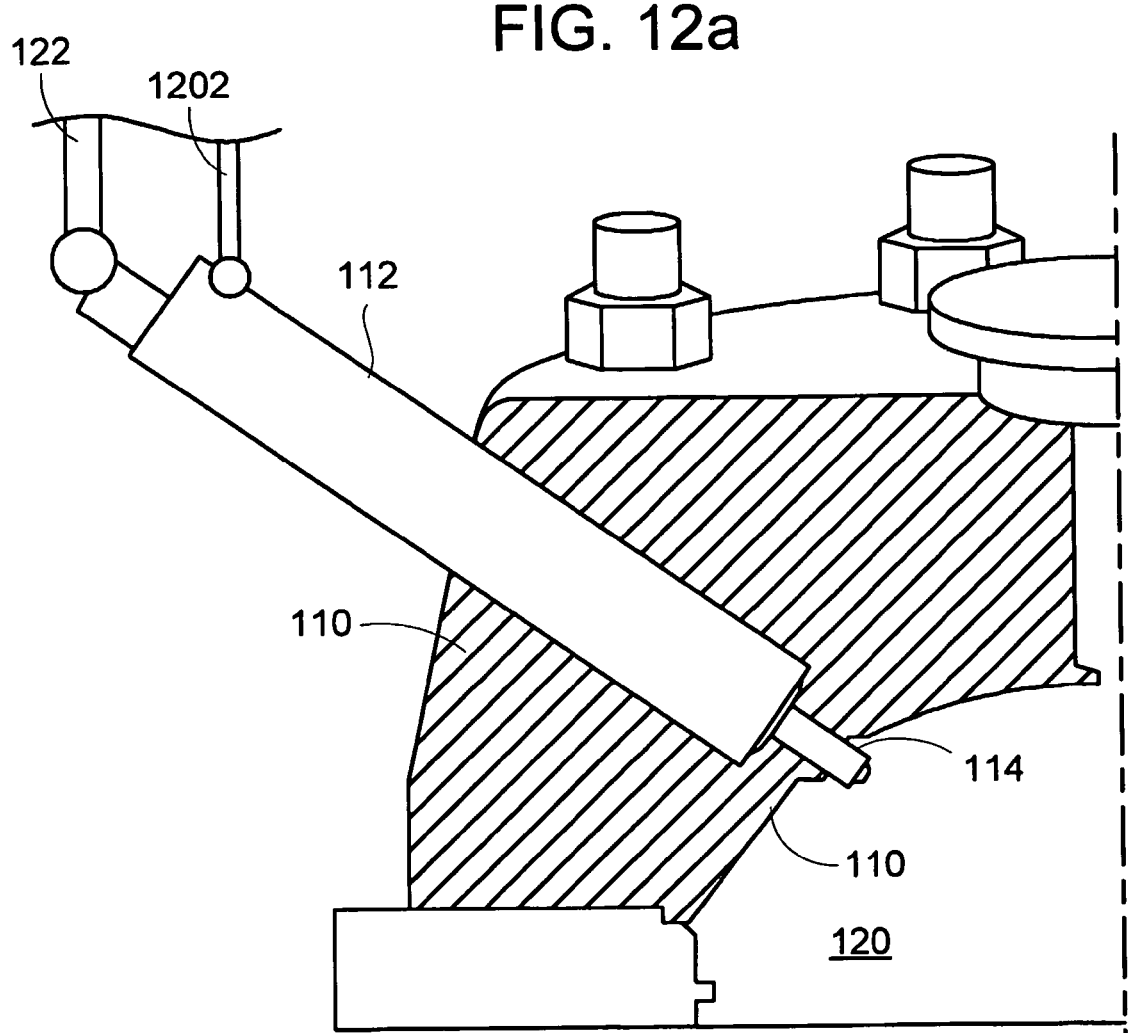
FIG. 12a is a schematic view of an alternate embodiment of an ion sensor used with the present invention in a sleeve integrated into a fuel injector.
Figure 12B:
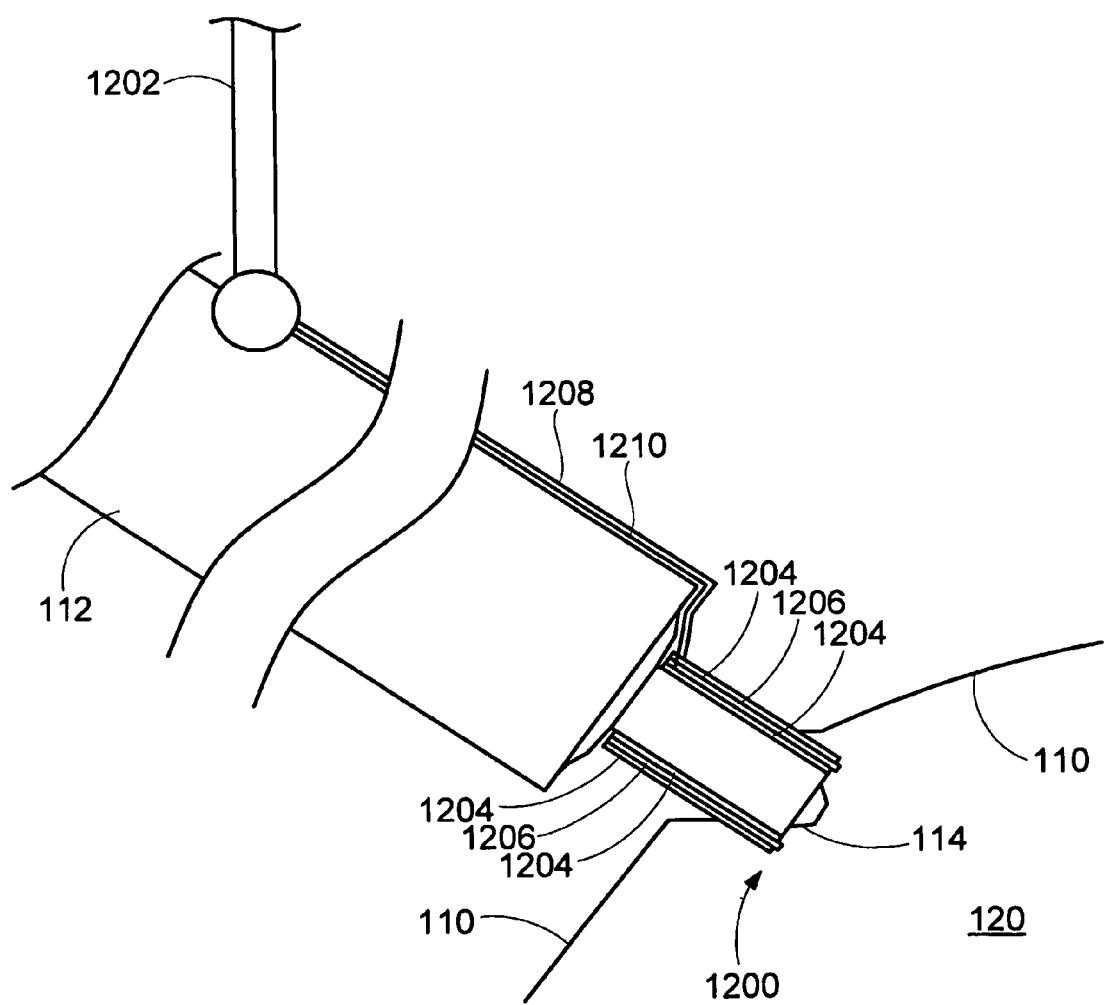

Turning now to FIGS. 12a and 12b, a fuel injector 112 with an ion-sensing sleeve 1200 around the nozzle 114 is shown. The controls 1208, 1210 for the sensor 1200 are routed down the injector 112 and are routed to the ionization module 102 and driver 104 via connection 1202 that is away from fuel injector inlet line 122. The controls comprise the ion bias voltage and heating current control 1210 that heat the electrode 1206 and a thermocouple 1208 for sensor temperature feedback control. It is important to keep the electrode 1206 at a sufficiently high temperature (e.g., 700 C) to prevent the formation of electrically conductive contaminants that can shunt the ion-sensing electrode, such as carbon, on the surface of the wafer. The ion bias voltage and heating current control 1210 provide sufficient current to maintain or otherwise keep the electrode 1206 at the desired temperature. In one embodiment, this is accomplished by heating the sensor sleeve 1204 (e.g., a ceramic wafer). The sensor sleeve 1204 can be made, for example, out of Silicon Nitrate wafer, with an imbedded electrode 1206 made, for example, out of Titanium Oxide.

Figure 13:
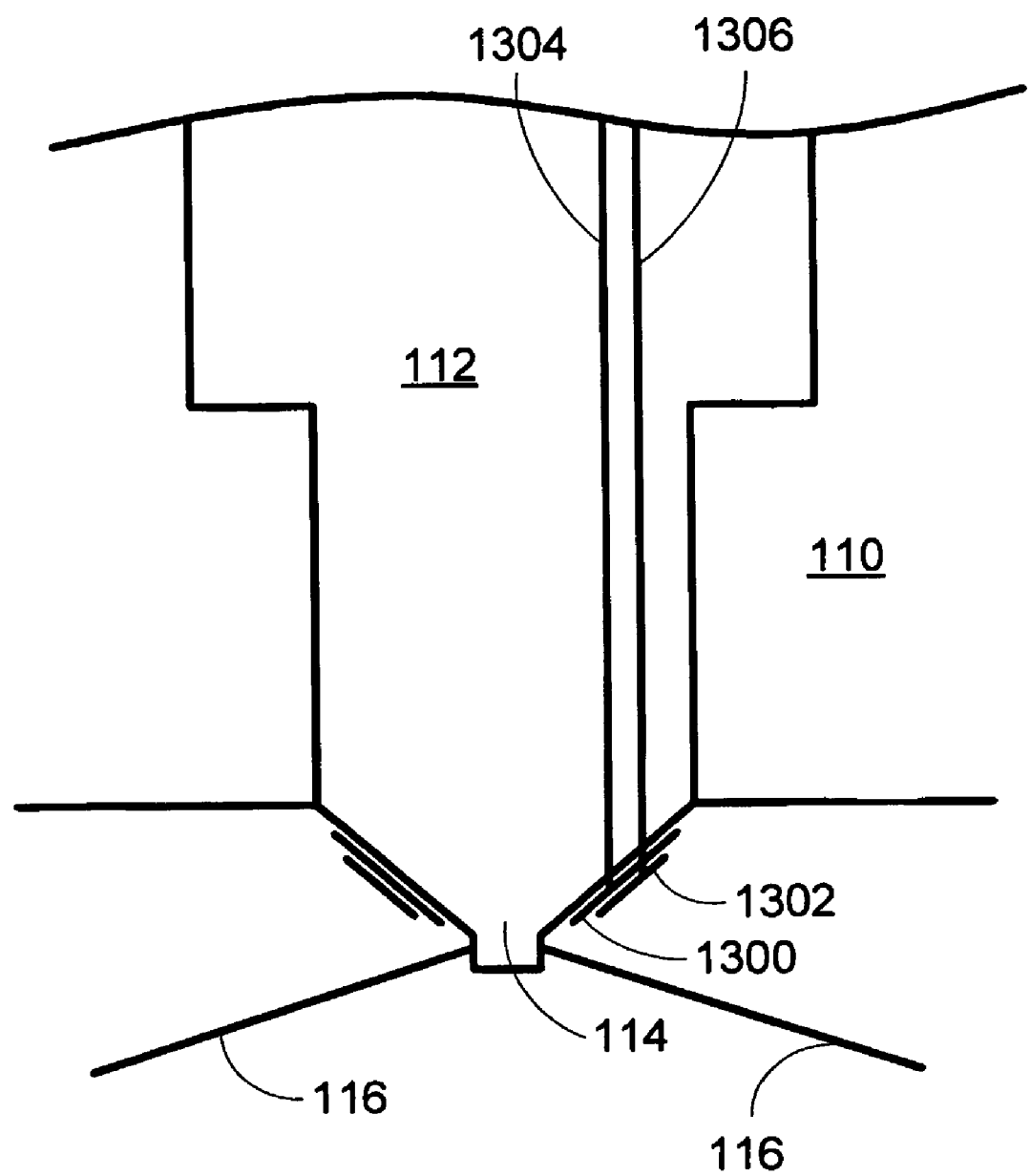
FIG. 13 is a schematic view of a further embodiment of an ion sensor used with the present invention integrated into the nozzle tip of a fuel injector.

Other types of arrangements integrating the ion sensor with the fuel injector 112 can be described. For example, in another embodiment of the ion sensor, the ion sensor is integrated directly into the nozzle tip of the fuel injector. This is illustrated in FIG. 13. Turning to FIG. 13, a heater 1300 and an ion sensing element 1302 are integrated directly into the nozzle tip 114. The integrated heater 1300 is controlled via line 1304 by driver 104. The heater 1300 keeps the temperature at around 700 C to protect the ion sensor from contamination. The ion sensing element 1302 is controlled by ionization module 102 via line 1306. The principle objective is to integrate the ion-sensor in the fuel injector 112 to eliminate the need of adding an extra opening in the engine cylinder head for the ion-sensor apparatus. Regardless of how the ion sensor is integrated, a temperature control should be used that keeps the insulating element of the sensor at sufficiently high temperature to prevent the formation of conductive contaminants that can short the ion-sensing electrode. The integrated heater eliminates signal deterioration due to fuel fouling by keeping the ion sensing element 1302 clean from fuel contamination.

Now that the operating environment and various embodiments of the ion sensing apparatus have been described, the control functions that can be used with the ion sensing apparatus will be described. The ionization signal is acquired with respect to an engine parameter over the combustion cycle. For example, the engine parameter may be crank angle, time after ignition, time from top dead center, etc. Crank angle is used herein in its most generic sense to include all of these. For example, crank angle is intended to be generic to measurement of the engine rotational parameter no matter whether it is measured directly in terms of crank angle degrees, or measured indirectly or inferred by measurement. It may be specified with respect to top dead center, with respect to ignition point, etc.

Figure 14:
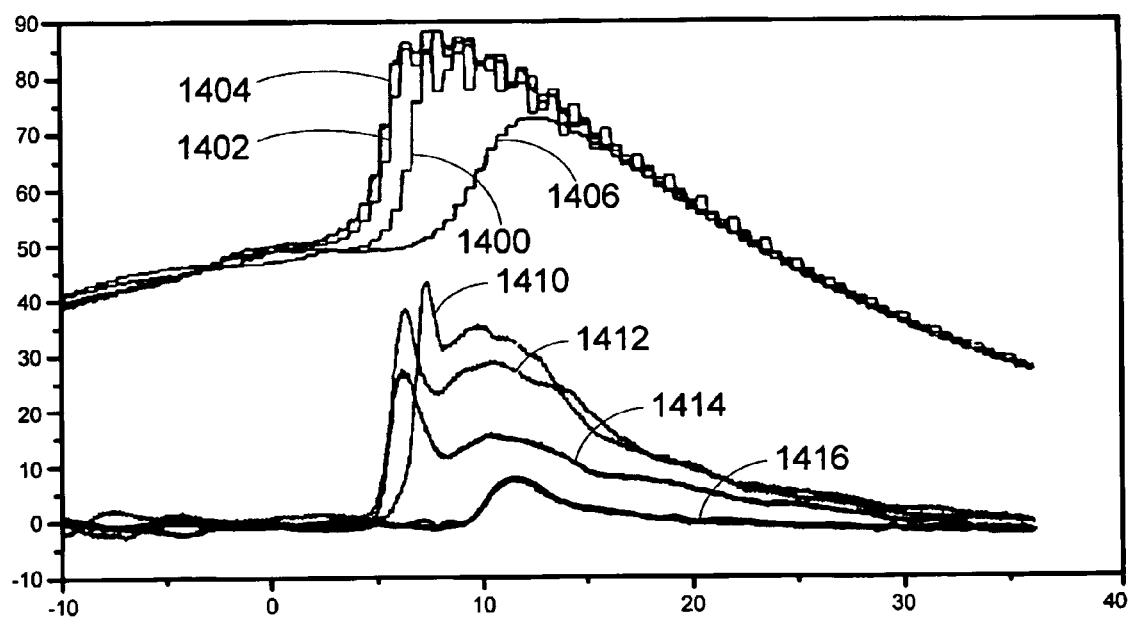
FIG. 14 is a graphical illustration of pressure and ionization current versus engine piston crank angle at various levels of EGR.
Figure 15:
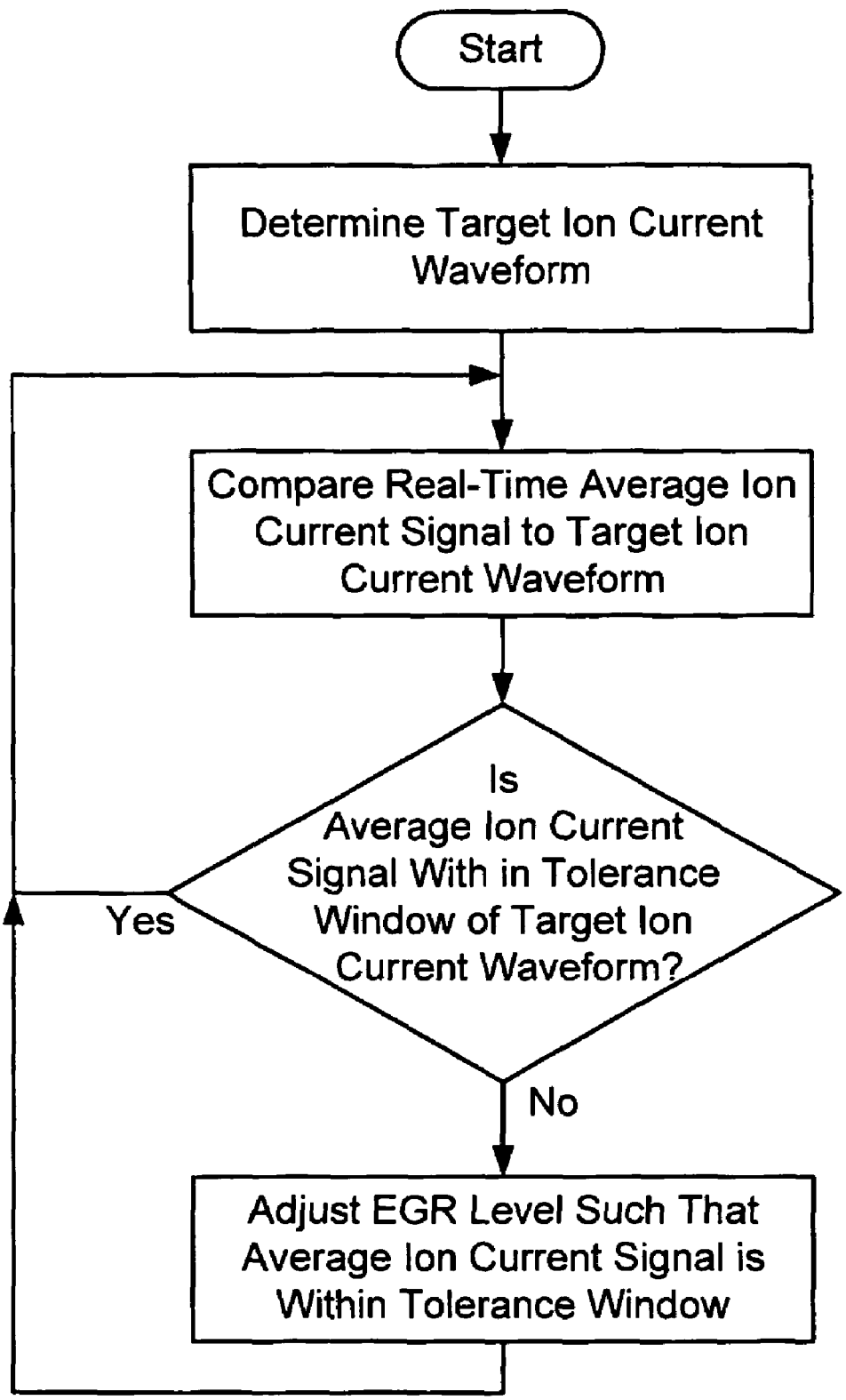
FIG. 15 is a flow chart illustrating the steps to control EGR based on ionization current in accordance with the teachings of the present invention.

One function that can be controlled with ion signals is EGR (Exhaust Gas Recirculation) control. It is known that more EGR in the air/fuel mixture lowers $NO_x$ emissions, too much EGR causes misfires, too low EGR may cause knock, and the right amount of EGR allows HCCI combustion. The ionization signal is used to control the level of EGR during steady state and transient operation. Turning now to FIG. 14, the average pressure and average ion current for four levels of EGR are shown. Curves 1400 to 1406 are average pressures and curves 1410 to 1416 are average ion currents. The engine operating parameters for the curves are that the engine load is 75 Nm and the start of combustion is at approximately 4 degrees after TDC for all curves. Curves 1400 and 1410 are for an EGR level of 40%. Curves 1402 and 1412 are for an EGR level of 45%. Curves 1404 and 1414 are for an EGR level of 50%. Curves 1406 and 1416 are for an EGR level of 55%. Note that curves 1406 and 1416 represent an engine condition where the engine has transitioned into HCCI combustion. It can be seen from FIG. 14 that as the average level of the ion signal lowers, the level of EGR increases, which results in correspondingly lower $NO_x$ emissions. Additionally, the timing or delay after injection of fuel where the start of the ion current occurs corresponds to an EGR level. Based upon these relationships, the level of EGR can be controlled from the level of the ion signal. In other words, the ion current signal can be used in a closed loop control to control the amount of EGR admitted into a combustion chamber based on the measurement of the ion signal. For example, as illustrated in FIG. 15, the ion current can be used in a feedback loop in a closed loop control system. The control system determines what the average ion current level is for the desired level of EGR and adjusts the level of EGR until the measured average ion current level is within a tolerance band of the average ion current corresponding to the desired level of EGR using control techniques as known in the art.

The level of EGR can be maximized by increasing the level of EGR until misfire is reached. The misfire can be detected in any number of ways. One way that misfire can be detected is using the ion signal. For example, in one embodiment, the method described in U.S. Pat. No. 6,742,499, entitled "Method And Apparatus For Detecting Abnormal Combustion Conditions In Lean Burn Reciprocating Engines", hereby incorporated by reference in its entirety, is used. As described therein, the variation of an ionization signal that changes with respect to an engine parameter over a combustion event of the engine is measured, a floating bounded space is associated with the ionization signal, and a determination is made if a portion of the ionization signal is within the floating bounded space. An indication is provided that the misfire condition has been detected if the portion of the ionization signal is within the floating bounded space. The floating bounded space and a starting point for the floating bounded space are determined. This includes receiving a set of ionization signals that change with respect to an engine parameter over a combustion event. The set of ionization signals has ionization signals corresponding to normal combustion conditions and ionization signals corresponding to a misfire condition for the engine. The starting point and size of the floating bounded space are adjusted such that selected portions of the ionization signals corresponding to the misfire condition reliably fall within the floating bounded space and the ionization signals corresponding to normal combustion conditions reliably fall outside the floating bounded space.

Figure 16A:
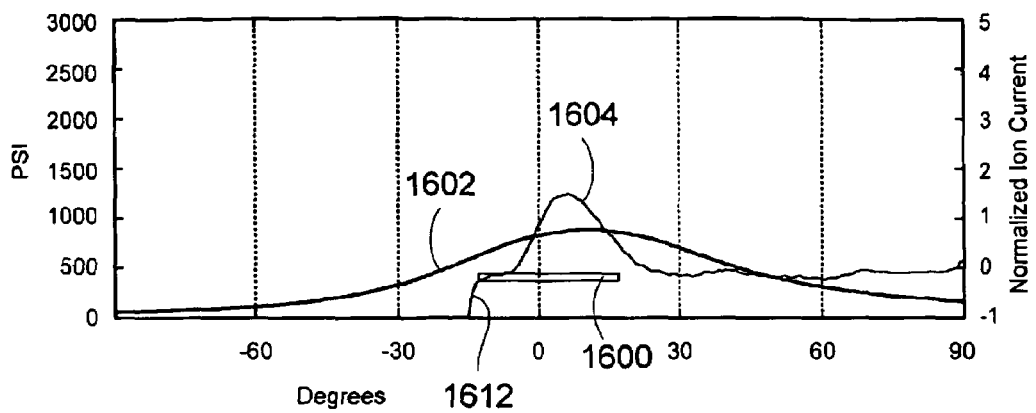
FIG. 16a is a graphical representation of pressure and ionization current versus engine piston crank angle for a normal combustion event.
Figure 16B:
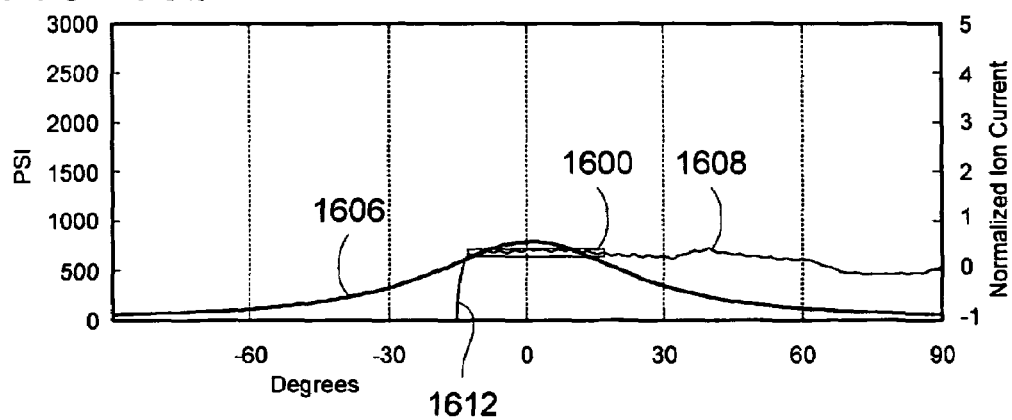
FIG. 16b is a graphical representation of pressure and ionization current versus engine piston crank angle for a misfire event.
Figure 16C:
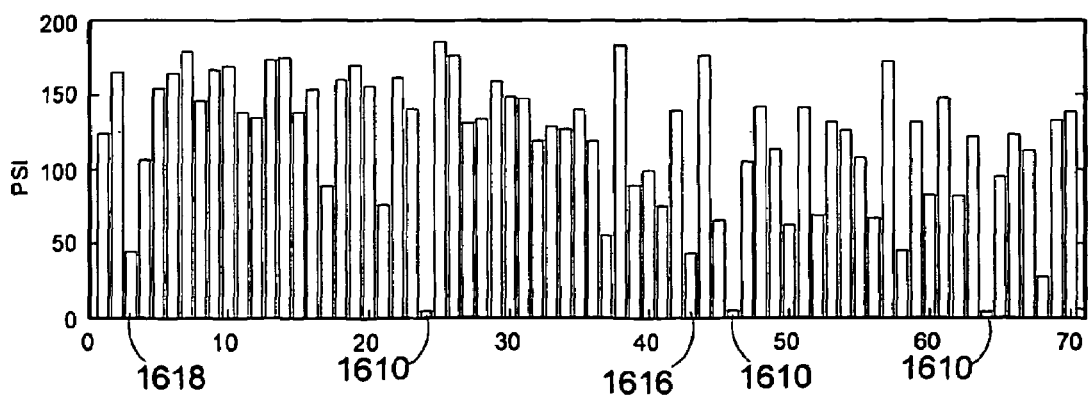
FIG. 16c is a graphical illustration of experimental data showing a correlation between indicated mean effective pressure of an engine cylinder and misfire that is used in sizing the floating bounded space of the present invention.

Turning now to FIGS. 16a-16c, the floating box 1600 for a misfire event is shown. FIG. 16a is an illustration of a representative cylinder pressure 1602 and ionization signal 1504 of a normal combustion condition. FIG. 16b is an illustration of a representative cylinder pressure 1606 and ionization signal 1608 for a misfire condition. A representative set of data points of the engine parameter for 70 engine cycles is shown in FIG. 16c. The engine parameter used is the IMEP of a cylinder. If the IMEP of any data point is below a selected amount, the data point is classified as a misfire condition. The selected amount should be set to a point that detects all the misfires. In one embodiment, the selected amount is a predetermined percentage of nominal. Data points 1610 in FIG. 16c correspond to a misfire condition. It can be seen that the ionization signal 1604 of a normal combustion condition has an initial short flattened portion from the initial starting point followed by a peaked portion. In contrast, the misfire condition remains substantially constant for a given duration. One characteristic of a misfire condition in the ionization signal for many engines is that a portion of the ionization signal remains substantially constant from the initial starting point 1612 of the ionization signal for an extended interval as can be seen in FIG. 16b and can be confined within a bounded space. Other characteristics may be used.

The tuning process is used to determine the starting point and size of the floating box using the characteristics of the ionization signals. The tuning process adjusts the size and position of the floating box to reliably capture the misfire condition and exclude the normal combustion condition. The starting point and size of the floating box is adjusted until the floating box is of sufficient size and at a location of the ionization signal with respect to crank angle such that a portion of the ionization signal of a misfire condition reliably remains within the floating box 1600 for the duration of the floating box 1600 as shown in FIG. 16b and leaves the floating box 1600 for a normal combustion condition as shown in FIG. 16a. This is accomplished by overlaying the floating box on the ionization signals corresponding to the normal and abnormal combustion cycles shown in FIG. 16c and adjusting the box parameters (e.g., starting point (with respect to crank angle (i.e., time) and ionization signal magnitude), duration, and height) to optimize the box. For example, the floating box is superimposed on ionization signals corresponding to the upper and lower extremes of data points 1610 (i.e., the misfire conditions) in the engine being characterized and the box parameters are adjusted such that the portion of the ionization signal reliably remains within the box for each condition. The floating box is then superimposed on the ionization signal for the normal ionization signals that are closest in form to the ionization signals for misfire conditions. For example, the ionization signals corresponding to data points 1612, 1614, and 1616 are likely to be closest in shape or form to ionization signals corresponding to misfire conditions. The floating box is then adjusted until the portion of the ionization signal of the normal combustion condition is not captured by the floating box. This process is repeated for all of the ionization signals in the data set for the various engine operating conditions (e.g., speed, engine load, desired air/fuel ratio, etc.) to ensure that the floating box reliably captures misfire conditions and excludes other conditions. The box parameters are then used during engine operation to detect misfire conditions.

During operation, the ionization signal analyzer 142 receives the ionization signal. It floats the floating box over the ionization signal in accordance with the box parameters. In one embodiment, the lowest magnitude of the ionization signal is determined beginning at the starting point of the floating box and ending at the boundary of the floating box (i.e., for the duration of the floating box). For example, if the duration of the floating box is thirty degrees of crank angle, the lowest magnitude of the ionization signal is determined over the thirty degrees of crank angle. The starting point of the floating box is then positioned at the starting point crank angle (i.e., time after ignition) at the lowest magnitude of the ionization signal. The ionization signal analyzer 142 then determines if the ionization signal remains within the floating box over the duration of the floating box. The ionization signal analyzer 142 provides an indication to the ionization signal control module 144 that a misfire has been detected if the ionization signal remains within the floating box over the duration of the floating box. FIG. 16*b* illustrates the ionization signal remaining within the floating box over the duration of the floating box.

The ionization signal control module 144 provides an indication to the engine ECU 106 of the misfire condition and to other modules as requested. The ECU 106 determines what action to take. In the case of EGR control, the ECU 106 commands EGR module 134 to reduce the amount of EGR admitted into the engine until misfire is either no longer happening or to a level of misfire that is acceptable for operation.

In one embodiment, the EGR module 134 adjusts the amount and/or rate of EGR admitted into the engine by increasing the level of EGR until the area under a running average of individual cycles of the ion current signal is at or below a specified threshold value. In other words, the integral of the ion current signal is below a threshold value. In one embodiment, the threshold value is zero. The running average at the point where the area under the ion current signal is at or below the specified value (e.g., zero) is defined to be the misfire limit. The level of EGR and/or the rate of EGR admitted into the combustion chamber 130 are lowered to a highest level such that the average ionization curve for an engine condition is at the minimum level above the misfire limit where misfire does not occur. In one implementation of this embodiment, a target ion current waveform is set to the average ion current corresponding to the predetermined amount above the misfire limit. The real time average ion current waveform is compared to the target ion current waveform. The level and/or rate of EGR are adjusted so that the real-time average ion current waveform is within a tolerance window of the target ion current waveform. If a level of EGR is desired, the target ion current is lowered to increase the level of EGR from the present level corresponding to the present target ion current. The target ion current is raised to decrease the level of EGR. In an alternate implementation, the level of EGR is increased until an individual ionization signal waveform has an area at or below the threshold value (e.g., zero). A target level is defined to be the running average of the ionization signal at the point that is one cycle before the individual signal waveform with the area at or below the threshold value. In other words, the target level is set to be just above the misfire limit. The level of EGR is then lowered to a level such that the running average of the ionization signal stays at the target level (i.e., just above the misfire limit). One method to perform this is to determine the desired starting point or rise of the average ionization current above a threshold level (e.g., above a zero level) that corresponds to the desired EGR target level and compare the starting point of the average ionization current during operation to the desired starting point and adjusting the EGR level until the starting point of the average ionization current is within a tolerance window of the desired starting point.

One approach to compare the real-time average ion current waveform to the target ion current waveform is to compare the location of a peak of the average ion current waveform to a peak of the target ion current waveform. For example, in some engines, the ionization signal has a second peak that corresponds to the peak combustion chamber temperature. The level of EGR and/or the rate of EGR injection are adjusted such that the location of the peak (e.g., the second peak) of the average ion current waveform is within a tolerance window of the peak of the target ion current waveform.

In another embodiment, the real-time angular delta between the start of combustion and the average peak location of the average ion current waveform is compared to the target angular delta between the start of combustion and the peak location of the target ion current waveform. The level of EGR and/or the rate of EGR injection are adjusted such that the real-time angular delta between the start of combustion and the average peak location of the average ion current waveform is within a tolerance window of the target angular delta between the start of combustion and the peak location of the target ion current waveform. The level of EGR is increased if the real-time angular delta is advanced of the target angular delta and is decreased if the real-time angular delta is retarded of the target angular delta.

In another embodiment, the level of EGR is adjusted by variably actuating one of the exhaust valves for varying lengths of time during the intake stroke of the particular combustion chamber in order to achieve the desired level of EGR. Other exhaust valves are actuated in a conventional manner.

Figure 17:
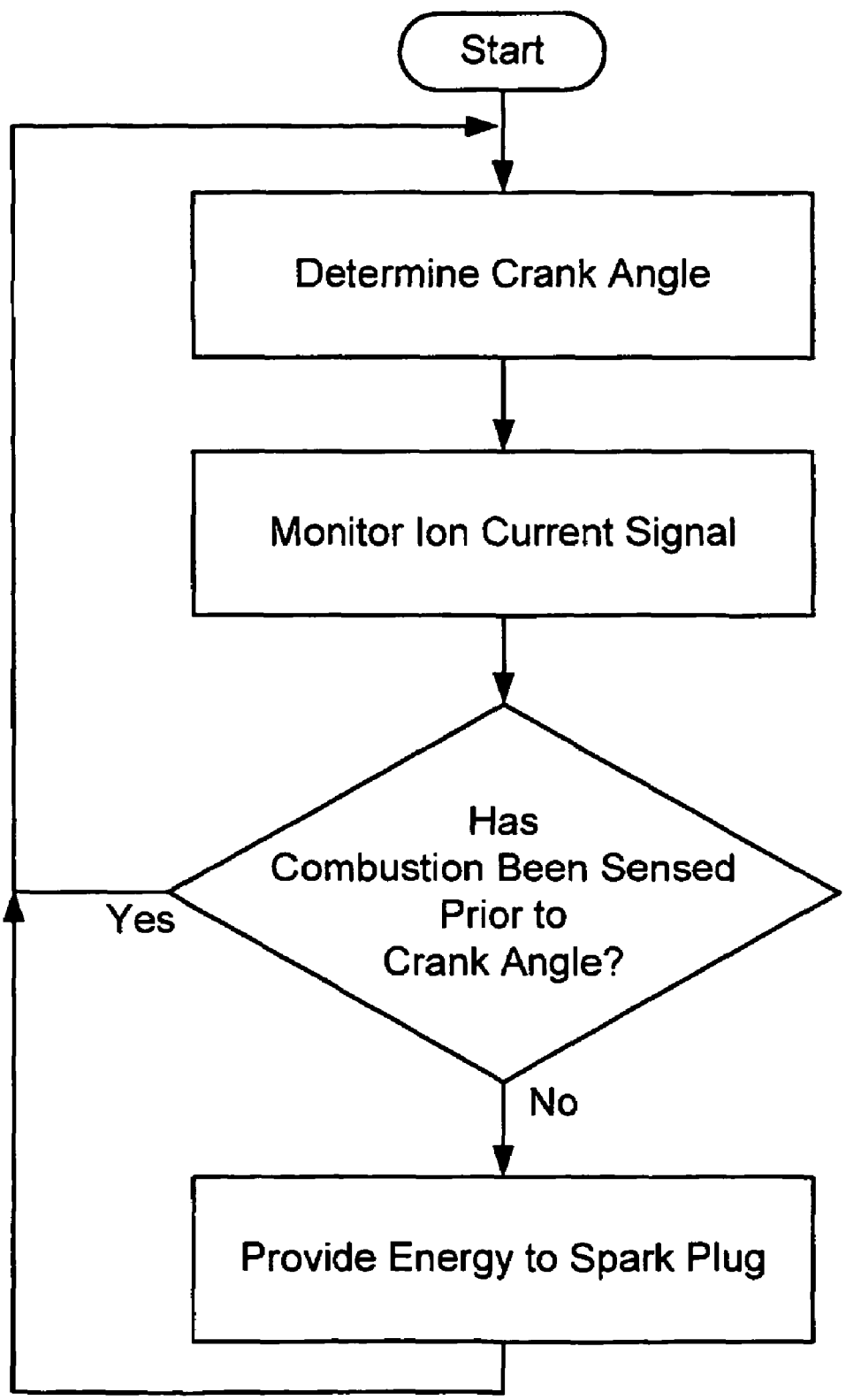
FIG. 17 is a flow chart illustrating the steps to prevent misfire using a spark plug type of ion sensor.

In a further embodiment, misfire is prevented via use of a spark plug type of ion sensor. Turning now to FIG. 17, the engine is characterized and a specified crank angle is determined where combustion of the diesel fuel mixture should have started prior to the crank angle being reached for various operating conditions. During operation, energy of a level sufficient to cause a high energy spark is provided to the spark plug type of ion sensor if combustion of the diesel fuel mixture has not been sensed prior to the specified crank angle. For example, if the rise of ion current has not been detected after the specified crank angle that corresponds to the desired start of combustion has passed, energy is provided to the spark plug type of ion sensor so that a spark is produced that ignites the diesel fuel mixture.

Figure 18:
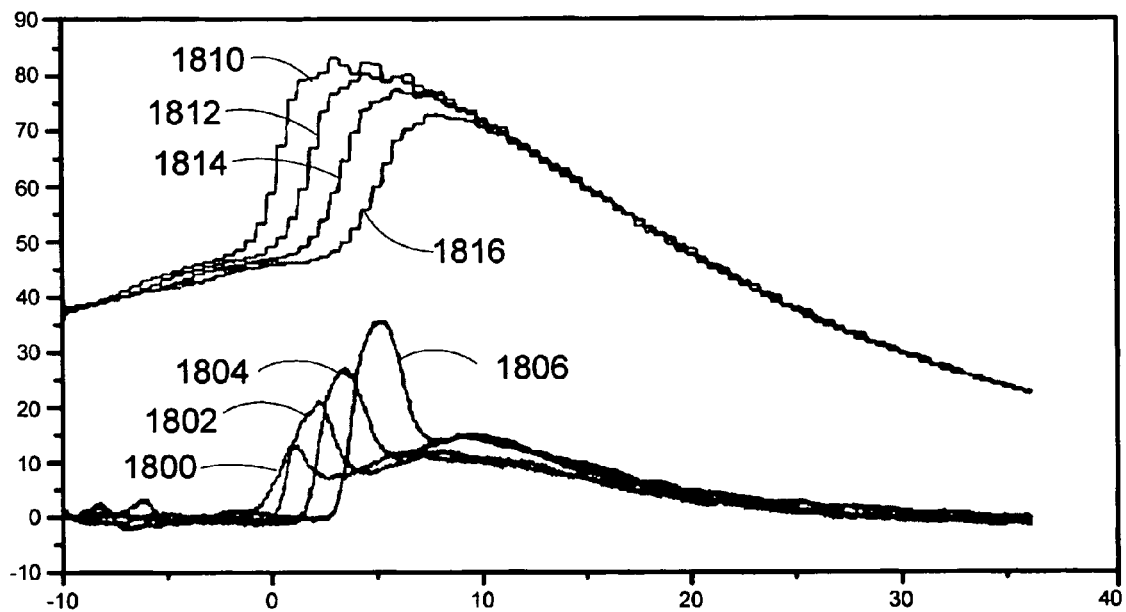
FIG. 18 is a graphical illustration of average ion signals and average pressure curves with injector timing changes of 2 degrees per step in a diesel engine having a load of 50 Nm and an EGR level of 50%.
Figure 19:
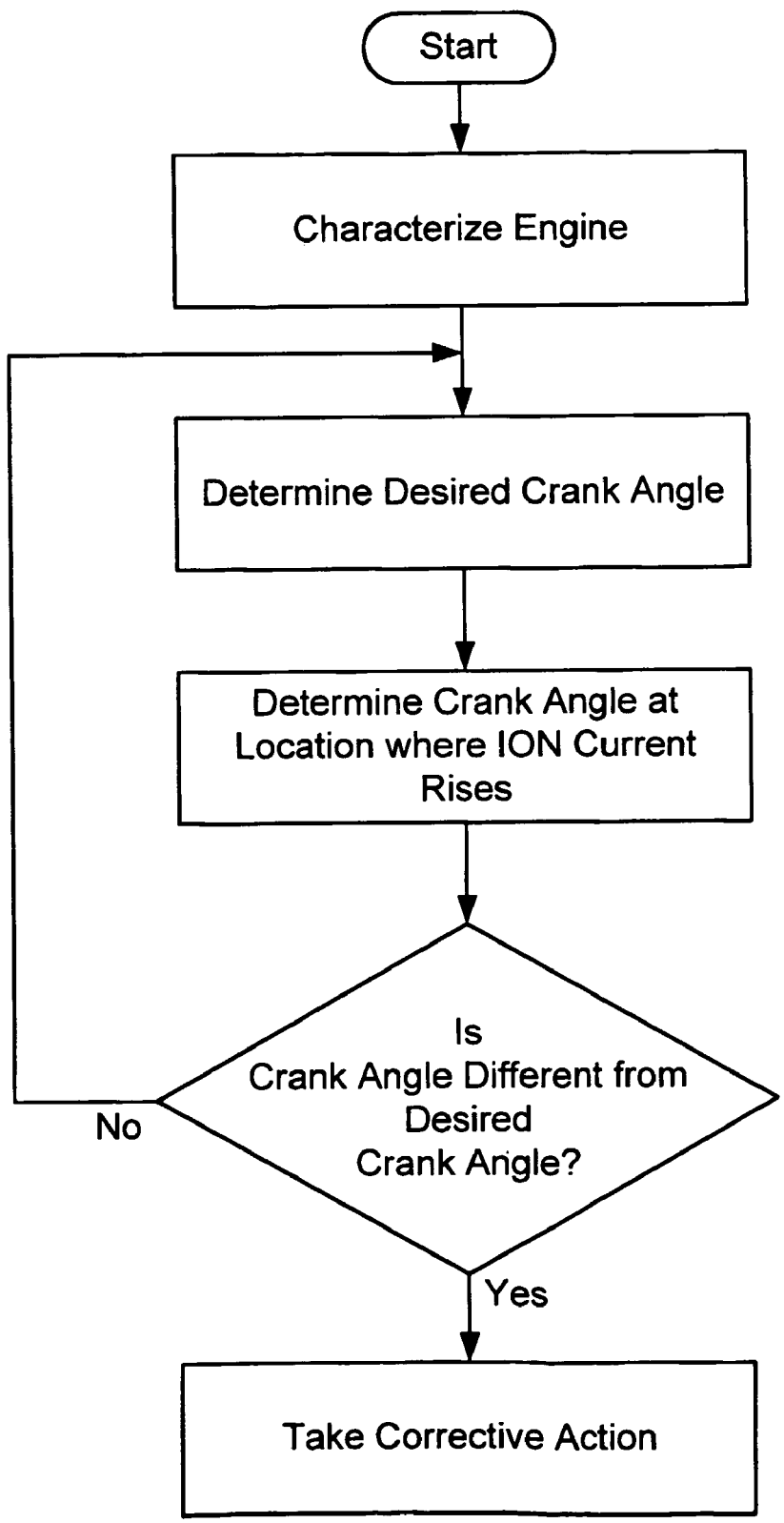
FIG. 19 is a flow chart illustrating the steps to control injection timing using ionization current in accordance with the teachings of the present invention.

The ion sensor apparatus can also be used to control the start of injection in a direct injection reciprocating compression ignition engine such as the injection timing of a diesel engine. Turning to FIG. 18, average ion signals 1800-1804 and average pressure curves 1810-1814 with injector timing changes of 2 degrees per step are shown. The diesel engine load is 50 Nm and the EGR level is 50% for all curves. Curves 1800 and 1810 correspond to a start of combustion at two degrees before top dead center (BTDC). Curves 1802 and 1812 correspond to a start of combustion at top dead center. Curves 1804 and 1814 correspond to a start of combustion at two degrees after top dead center (ATDC). Curves 1806 and 1816 correspond to a start of combustion at four degrees ATDC. It can be seen that the peak of the ion current and the location of the peak changes with the injector timing. As the injector timing increases beyond TDC (i.e., start of combustion is at a higher degree ATDC), the peak of the ion current increases and the location of the peak moves away from TDC to an increasing number of degrees ATDC. Similarly, as the injector timing moves before TDC, the peak of the ion current decreases and the location of the peak moves to an increasing number of degrees BTDC. The rise of the ion signal also moves in the same relationship as the location of the peak of the ion signal. This relationship is used to control injection timing (e.g., start of combustion). For example, the crank shaft angle can be determined by detecting when the ion current signal rises. The crank shaft angle is the angle at the point that the ion current signal changes and starts to rise. Turning now to FIG. 19, the engine is characterized to determine crank shaft angles where the rise of ion current should occur for various operating conditions. The start of fuel injection is controlled in a closed loop fashion by sensing where the crank shaft angle of the rise of the ion signal occurs. This angle is compared to a desired crank angle based on the engine characterization. If the rise of the ion signal occurs at a different angle, corrective action is taken so that the crank shaft angle of the rise of the ion signal moves to within a tolerance window of the desired angle of injection. In one embodiment, an average of at least two prior cycles is used to determine an average of the rise of ion current.

The ion sensor apparatus can also be used to control the maximum power of the compression ignition engine. One methodology to control the maximum power is to control the burn rate of the engine. The burn rate is the speed at which the combustion propagates across a cylinder. As an engine burns leaner, the combustion takes longer to propagate away from the ignition point. The slowing down of the combustion causes a longer burn time between the ignition point and the location in crank angles where approximately half of the mixture is burned. The position where approximately half of the mixture is burned is called the "50% Burn Point" and is often measured in crank angle degrees. In one embodiment, the engine is characterized and the relationship between the second peak of the ion current waveform and burn rate is determined. In this embodiment, the real time average of the crank shaft angle of the second peak of the ion current waveform is compared to a target crank angle that corresponds to the desired burn rate according to the engine characterization. The rate of fuel admitted into a cylinder is adjusted such that the real time average of the angle of the second peak of the ion current waveform is within a tolerance window of the target angle. If the real time average of the crank shaft angle of the second peak of the ion current wave form is advanced of the target angle, the rate of fuel admitted into the combustion chamber is decreased until the real time average of the crank shaft angle of the second peak of the ion current wave form is within a tolerance of the target angle. Similarly, if the real time average of the crank shaft angle of the second peak of the ion current wave form is retarded of the target angle, the rate of fuel admitted into the combustion chamber is increased until the real time average of the crank shaft angle of the second peak of the ion current wave form is within a tolerance of the target angle.

Figure 20:
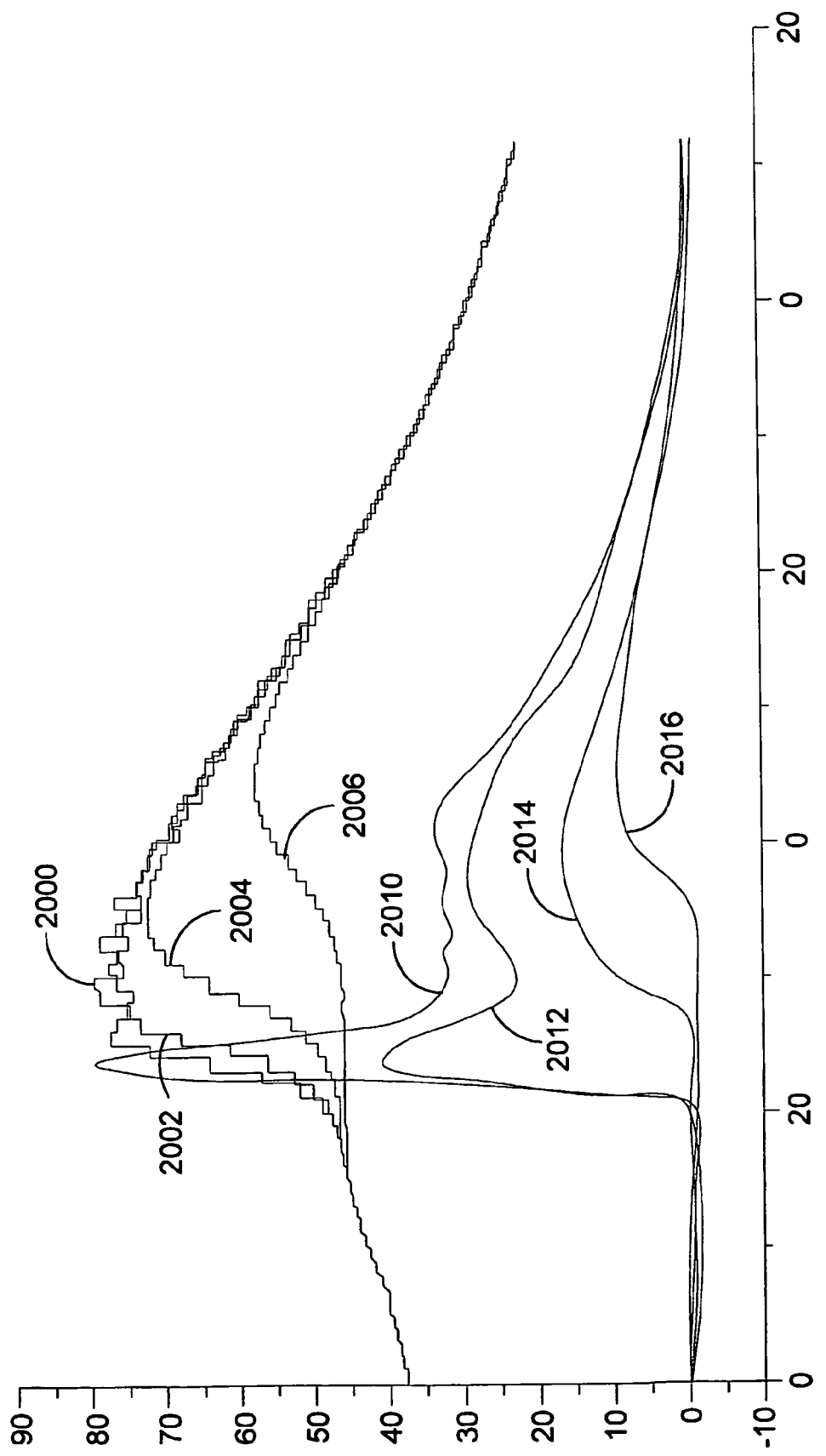
FIG. 20 is a graphical illustration of average ion signals and average pressure curves with various EGR levels in an engine having a load of 50 Nm.

In an alternate embodiment, the burn rate can also be controlled by adjusting the amount and/or rate of EGR admitted into the engine. FIG. 20 shows ion current and cylinder pressure for an engine operating with a fixed load. Curves 2000 to 2006 are curves of cylinder pressure and curves 2010 to 2016 are curves of ion current. Curves 2000 and 2010 are curves corresponding to an EGR level of 45%. Curves 2002 and 2012 are curves corresponding to an EGR level of 50%. Curves 2004 and 2014 are curves corresponding to an EGR level of 55%. Curves 2006 and 2016 are curves corresponding to an EGR level of 59%. From these curves it can be seen that very high levels of EGR slow the burn rate down and lower the rate of rise of cylinder pressure. By knowing this relationship for an engine, the burn rate can be controlled by determining a desired EGR percentage associated with the desired burn rate and adjusting the EGR admitted into the engine based on the ion current waveform.

It can be seen from the foregoing that an apparatus and method to detect ion current and perform EGR control, injection timing, and diesel ignition cold starts has been described. The apparatus eliminates the need for a glow plug by using a spark plug type of sensor or an ion sensor integrated onto a fuel injector. The spark plug type of ion sensor can also be used to provide cold start of diesel ignition at reduced levels of $NO_x$. Signal deterioration of the ion sensor due to fuel fouling is eliminated by means of either a high energy plasma discharge (or a heater) that keeps the sensor area clean from fuel contamination. The spark plug type of sensor also allows detection of combustion ions from pre-mixed flame instead of diffusive flame, thereby allowing correlation of the combustion ions with combustion quality (e.g., $NO_x$ emission level).

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for controlling the level of exhaust gas recirculation (EGR) admitted into a combustion chamber of a reciprocating engine comprising the steps of:

evaluating an ionization signal;

comparing a real time average ion current signal to a target ion current wave form corresponding to a desired level of EGR; and adjusting the level of EGR admitted into the combustion chamber based on the evaluation of the ionization signal and such that the real time average ion current signal is within a tolerance window of the target ion current wave form.

2. The method of claim 1 wherein the step of adjusting the level of EGR admitted into the combustion chamber further includes adjusting the level of EGR admitted into the combustion chamber to a highest level such that the average real time ion current signal is at a minimum level where misfire does not occur.

3. The method of claim 2 wherein the step of adjusting the level of EGR to the highest level such that the average real time ion current signal is at the minimum level where misfire does not occur comprises the steps of:
increasing the level of EGR until an individual cycle ionization signal curve has an area at or below a threshold level;
defining a target level for the running average at the point that is one cycle before the individual cycle ionization signal curve with an area at or below the threshold level; and
lowering the level of EGR to the a level such that the average ionization curve for that engine condition stays proximate to the target level.

4. The method of claim 1 further comprising the steps of:
lowering the target average ion current to increase the desired level of EGR; and
raising the target average ion current to decrease the desired level of EGR.

5. The method of claim 4 further comprising the step of determining a starting point of the average ionization current above a threshold level corresponding to the desired level of EGR and wherein the step of comparing an average ion current signal to the target average ion current comprises the step of comparing a starting point of the average ionization current to a desired starting point target for the rise of the average ionization current.

6. The method of claim 1 further comprising the step of measuring the ionization signal with a negative polarity of ionization on the electrode of an ion sensor.

7. The method of claim 1 further comprising the steps of:
receiving a plurality of ion current signals over a plurality of engine combustion cycles; and
averaging the plurality of ion current signals to derive the real time average ion current.

8. The method of claim 7 wherein the step of receiving the plurality of ion current signals over a plurality of engine combustion cycles comprises the step of measuring the plurality of ion current signals over a set number of engine combustion cycles.

9. The method of claim 8 wherein the step of measuring the plurality of ion current signals comprises the step of measuring the plurality of ion current signals using a spark plug type of ion sensor.

10. The method of claim 8 wherein the step of measuring the plurality of ion current signals comprises the step of measuring the plurality of ion current signals using an ion sensing apparatus integral with an ignition system.

11. The method of claim 1 wherein the ionization signal has a second peak corresponding to the peak temperature of the combustion process and the step of adjusting the level of EGR admitted into the combustion chamber based on the evaluation of the ionization signal comprises the steps of:
comparing a real time average of a crank shaft angle of the second peak of the ionization signal to a target angle of the second peak of the ionization signal corresponding to a desired level of EGR; and
adjusting the level of EGR admitted into the combustion chamber such that the real time average of the angle of the second peak of the ionization signal is within a tolerance window of the target angle.

12. The method of claim 11 wherein the step of adjusting the level of EGR admitted into the combustion chamber such that the real time average of the angle of the second peak of the ionization signal is within a tolerance window of the target angle comprises the steps of:
if the real time average of the crank shaft angle of the second peak of the ionization signal is advanced of the target angle, increasing the level of EGR until the real time average of the crank shaft angle of the second peak of the ionization signal is within a tolerance of the target angle; and
if the real time average of the crank shaft angle of the second peak of the ionization signal is retarded of the target angle, decreasing the level of EGR until the real time average of the crank shaft angle of the second peak of the ionization signal is within a tolerance of the target angle.

13. The method of claim 1 wherein the reciprocating engine is a diesel engine.

14. The method of claim 1 wherein the reciprocating engine is a homogeneous charge compression ignition (HCCI) engine.

15. A method for controlling the level of exhaust gas recirculation (EGR) admitted into a combustion chamber of a reciprocating engine comprising the steps of:
comparing the real time average peak location of the ion current signal to a target angular peak location of an average ion current corresponding to a desired level of EGR; and
adjusting the level of EGR admitted into the combustion chamber such that the average peak location of the ion current signal is within a tolerance window of the target angular peak location.

16. The method of claim 15 further comprising the step of measuring the ionization current with a negative polarity of ionization on the electrode of an ion sensor.

17. A method for controlling the level of exhaust gas recirculation (EGR) admitted into a combustion chamber of a reciprocating engine comprising the steps of:
comparing a real time delta between the start of combustion and the average peak location of the ion current signal to a target angular delta between the start of combustion and the peak location of the average ion current that corresponds to a desired level of EGR; and
adjusting the level of EGR admitted into the combustion chamber such that the delta between the start of combustion and the average peak location of the ion current signal is within a tolerance window of the target angular delta.

18. The method of claim 17 further comprising the step of measuring the ionization current with a negative polarity of ionization on the electrode of an ion sensor.

19. A method for adjusting the rate of injection of exhaust gas recirculation (EGR) admitted into a combustion chamber of a reciprocating engine comprising the steps of:
comparing a real time delta between the start of combustion and the average peak location of the ion current signal to a target angular delta between the start of combustion and the peak location of the average ion current that corresponds to a desired level of EGR; and
adjusting the rate of injection of EGR admitted into the combustion chamber such that the delta between the start of combustion and the average peak location of the ion current signal is within a tolerance window of the target angular delta.

20. The method of claim 19 further comprising the step of measuring the ionization current with a negative polarity of ionization on the electrode of an ion sensor.

21. A method for controlling the level of exhaust gas recirculation (EGR) admitted into a combustion chamber having two exhaust valves of a reciprocating engine comprising the steps of:
actuating a first exhaust valve of the two exhaust valves in a normal fashion; and
variably actuating a second exhaust valve of the two exhaust valves corresponding to a desired level of EGR.

22. The method of claim 21 wherein the step of variably actuating the second exhaust valve includes the step of opening the second exhaust valve for varying lengths of time during an intake stroke of the reciprocating engine.

23. The method of claim 22 wherein the step of opening the second exhaust valve for varying lengths of time during an intake stroke includes the step of opening the second exhaust valve for varying lengths of time based upon feedback from an ionization current signal in order to achieve the desired level of the level of EGR admitted into the combustion chamber.

24. The method of claim 23 further comprising the step of measuring the ionization current with a negative polarity of ionization on the electrode of an ion sensor.

* * * * *